United States Patent
Hishinuma

(10) Patent No.: US 9,776,795 B2
(45) Date of Patent: Oct. 3, 2017

(54) CURVED BELT CONVEYOR APPARATUS

(71) Applicant: SANKI ENGINEERING CO., LTD., Tokyo (JP)

(72) Inventor: Nobuya Hishinuma, Yokohama (JP)

(73) Assignee: SANKI ENGINEERING CO., LTD., Tokyo (JP)

( * ) Notice: Subject to any disclaimer, the term of this patent is extended or adjusted under 35 U.S.C. 154(b) by 0 days.

(21) Appl. No.: 15/328,836

(22) PCT Filed: Mar. 16, 2015

(86) PCT No.: PCT/JP2015/001444
§ 371 (c)(1),
(2) Date: Jan. 24, 2017

(87) PCT Pub. No.: WO2016/024373
PCT Pub. Date: Feb. 18, 2016

(65) Prior Publication Data
US 2017/0210566 A1   Jul. 27, 2017

(30) Foreign Application Priority Data

Aug. 15, 2014 (JP) ................................ 2014-165375
Dec. 19, 2014 (JP) ................................ 2014-258026

(51) Int. Cl.
*B65G 15/02* (2006.01)
*B65G 39/16* (2006.01)

(52) U.S. Cl.
CPC ............. *B65G 15/02* (2013.01); *B65G 39/16* (2013.01)

(58) Field of Classification Search
CPC ...................................................... B65G 15/02
(Continued)

(56) References Cited

U.S. PATENT DOCUMENTS 5,839,570 A * 11/1998 Vertogen ................ B65G 15/02
198/831
5,938,006 A   8/1999 Fisher
(Continued)

FOREIGN PATENT DOCUMENTS

JP   H03-166107 A   7/1991
JP   H08-133438 A   5/1996
(Continued)

OTHER PUBLICATIONS

Jun. 9, 2015 International Search Report issued in International Patent Application No. PCT/JP2015/001444.

*Primary Examiner* — William R Harp
(74) *Attorney, Agent, or Firm* — Oliff PLC

(57) ABSTRACT

A pressing pulley is formed of a tapered roller having an angle same as a taper angle of a head pulley and having a length in a rotation axis direction of a tapered outer tube which is set to be shorter than a length in a rotation axis direction of a taper-shaped outer tube of the head pulley, and the pressing pulley is arranged in a state where a large-diameter-side end portion of the tapered outer tube is positioned in a vicinity of an outer peripheral edge portion of a fan-shaped belt and the pressing pulley is inclined so that a peripheral surface of the tapered outer tube presses a portion close to the outer periphery in a length from a pivot to the outer peripheral edge portion of the fan-shaped belt wound around the head pulley against a peripheral surface of the taper-shaped outer tube of the head pulley.

19 Claims, 16 Drawing Sheets

(58) Field of Classification Search
USPC .......................................................... 198/831
See application file for complete search history.

(56) References Cited

U.S. PATENT DOCUMENTS

| | | | | |
|---|---|---|---|---|
| 5,944,171 | A * | 8/1999 | Vertogen | B65G 15/02 198/837 |
| 6,962,252 | B2 * | 11/2005 | Fujiwara | B65G 15/00 198/831 |
| 7,004,310 | B2 * | 2/2006 | Axmann | B65G 15/60 198/831 |
| 7,073,660 | B1 * | 7/2006 | Hishinuma | B65G 15/02 198/831 |
| 7,249,673 | B2 * | 7/2007 | Axmann | B65G 15/02 198/831 |
| 9,120,628 | B2 * | 9/2015 | Ventz | B65G 15/02 |
| 2005/0199474 | A1 | 9/2005 | Axmann | |
| 2011/0120838 | A1 | 5/2011 | Kuhn | |

FOREIGN PATENT DOCUMENTS

| | | |
|---|---|---|
| JP | 2005-255416 A | 9/2005 |
| JP | 2007-106595 A | 4/2007 |
| JP | 2011-520726 A | 7/2011 |

* cited by examiner

CURVED BELT CONVEYOR APPARATUS

CROSS-REFERENCE TO RELATED APPLICATION

This application is a U.S. National Stage application claiming the benefit of prior filed International Application Number PCT/JP2015/001444, filed Mar. 16, 2015, in which the International Application claims priority from Japanese Application Numbers 2014-165375 (filed on Aug. 15, 2014) and 2014-258026 (filed on Dec. 19, 2014), the entire contents of which are incorporated herein by reference.

TECHNICAL FIELD

The present invention relates to a curved belt conveyor apparatus used for changing a conveyance direction of a conveyance object. The present invention particularly relates to a curved belt conveyor apparatus provided for changing a conveyance direction of a light-weight and small-sized conveyance object, and having a head pulley and a tail pulley each having a small diameter for making the conveyance object transfer to an upstream or downstream conveyor.

BACKGROUND ART

As a method of conveying a light-weight conveyance object or a heavy conveyance object, one in which the conveyance object is conveyed by using a plurality of belt conveyor apparatuses arranged along a conveyance route of the conveyance object, is generally employed. As one of such belt conveyor apparatuses, there is a curved belt conveyor apparatus for changing a conveyance direction of a conveyance object. The curved belt conveyor apparatus is an apparatus in which an endless fan-shaped belt is wound around two end pulleys (a head pulley and a tail pulley) which are pivotally supported by an apparatus frame with an opening angle of 90 degrees, for example, provided therebetween. In particular, in order to change a conveyance direction of a light-weight and small-sized conveyance object, each of two end pulleys is required to have a small diameter for making the conveyance object transfer to an upstream or downstream conveyor. When such a curved belt conveyor is driven to travel the fan-shaped belt, a circumferential speed on an inside diameter side, being a side close to a pivot of the fan-shaped belt, and a circumferential speed on an outside diameter side, are different, so that it is often the case where both of a head pulley and a tail pulley being end pulleys are set as driven pulleys, and for each of the pulleys, there are used short pulleys with straight outer cylinders which are rotatably provided in a parallel manner by being externally fitted to a center shaft.

Further, in a curved belt conveyor apparatus, two end pulleys are arranged with a predetermined opening angle of 90 degrees, for example, provided therebetween, so that tension toward a pivot side, namely, an inside diameter side of a fan-shaped belt (tension in an inside diameter direction) is inevitably generated with respect to the fan-shaped belt. Therefore, when a curved belt conveyor apparatus is driven by providing a driving device at an intermediate position of the apparatus, thereby traveling a fan-shaped belt, the fan-shaped belt is displaced in the inside diameter direction due to tension in the inside diameter direction applied to the fan-shaped belt, and both of a head pulley and a tail pulley are slipped out of an endless belt which surrounds the pulleys from a forward side and a return side of the fan-shaped belt, which definitely causes slip between the end pulley and a rear surface of the fan-shaped belt.

In order to solve such problems, there is a technique in which, for example, a timing belt is attached to a rear surface of an outside-diameter-side end portion (outer peripheral edge portion) of a fan-shaped belt, a sprocket is provided to a head pulley at an outside diameter portion of the fan-shaped belt to drive the timing belt, the head pulley and a tail pulley are set as driven pulleys, and for each of the pulleys, there are used short pulleys with straight outer cylinders which are turnably provided in a parallel manner by being externally fitted to a center shaft, and there is devised a curved belt conveyor apparatus in which a plurality of fastening elements with which shoulder portions of the timing belt attached to the rear surface of the outside-diameter-side end portion of the fan-shaped belt are pulled and fastened from the rear surface toward the outside diameter direction of the fan-shaped belt (idling rollers abutted against a front surface of the fan-shaped belt, and fastening rollers abutted against the shoulder portions of the timing belt attached to the rear surface of the fan-shaped belt) are provided with a predetermined angle interval provided therebetween, and by pulling the fan-shaped belt in the outside diameter direction being an opposite direction of the inside diameter direction toward a pivot, the fan-shaped belt is prevented from being displaced in the inside diameter direction (refer to Patent Document 1). Further, other than the above, there is also devised a curved belt conveyor apparatus in which there is provided a turning mechanism including a driving rotation member having a toothed belt which endlessly turns between an outer peripheral edge portion of a belt part on a forward side of a fan-shaped belt and an outer peripheral edge portion of a belt part on a return side of the fan-shaped belt, and which is covered by a plurality of blocks embedded with magnets at an outer peripheral portion thereof, and driven rotation members having toothed belts which endlessly turn on the outside of belt on the forward side of the fan-shaped belt and on the outside of belt on the return side of the fan-shaped belt, respectively, and each of which is covered by a plurality of blocks embedded with magnets at an outer peripheral portion thereof, and when a driving mechanism drives the driving rotation member, the magnets of the blocks covered with respect to the toothed belt of the driving rotation member are made to attract the magnets of the blocks covered with respect to the toothed belts of the driven rotation members to travel the fan-shaped belt while sandwiching the fan-shaped belt, thereby preventing the fan-shaped belt from being displaced in an inside diameter direction (refer to Patent Document 2).

Patent Document 1: Japanese Unexamined Patent Application Publication (Translation of PCT Application) No. 2011-520726

Patent Document 2: Japanese Unexamined Patent Application Publication No. 2007-106595

DISCLOSURE

Problems to be Solved

However, in the curved belt conveyor apparatus disclosed in Patent Document 1, the end pulley formed by arranging the plurality of small pulleys in a parallel manner, is arranged so that peripheral surfaces of the respective small pulleys are abutted against the rear surface of the fan-shaped belt, and accordingly, when the respective small pulleys rotate, the fan-shaped belt is worn out by edges of the small pulleys, resulting in that the fan-shaped belt is easily damaged. Further, although the plurality of fastening elements for fastening the outer peripheral edge portion of the fan-shaped belt are used as the mechanism of preventing the fan-shaped belt from being displaced in the inside diameter direction, if accuracy of assembling positions of these fastening elements is poor, the outer peripheral edge portion of the fan-shaped belt is easily damaged, so that skillfulness is required at the time of assembling the fastening elements. Further, in the curved belt conveyor apparatus disclosed in Patent Document 2, although there is no need to provide the fastening elements disclosed in Patent Document 1, the configuration of the turning mechanism is complicated, and there is a problem such that skillfulness is required when performing positional adjustment of the driving rotation member and the driven rotation members configuring the turning mechanism. Further, in the curved belt conveyor apparatus using the turning mechanism as described above, although a traveling direction of the toothed belt when each of the driving rotation member and the driven rotation members rotates is a straight direction, a traveling direction of the fan-shaped belt is a circumferential direction, so that the front surface of the fan-shaped belt and the edges of the toothed belts of the driven rotation members are easily rubbed against with each other, resulting in that the front surface of the fan-shaped belt is worn out. When food products, cosmetics, or the like are conveyed as light-weight conveyance objects, for example, the wear-out of the front surface of the fan-shaped belt is not favorable in terms of management and hygiene. Therefore, since it is required to frequently replace the fan-shaped belt, a cost of the curved belt conveyor apparatus itself is increased.

The proposition of the present invention is to provide a curved belt conveyor apparatus capable of preventing damage to a fan-shaped belt by stably traveling the fan-shaped belt. In particular, the proposition of the present invention is to provide a curved belt conveyor apparatus provided for changing a conveyance direction of a light-weight and small-sized conveyance object, and having a head pulley and a tail pulley each having a small diameter for making the conveyance object transfer to an upstream or downstream conveyor.

Means for Solving the Problems

In order to solve the above-described problems, a curved belt conveyor apparatus of the present embodiment is characterized in that it includes an endless fan-shaped belt including, at a position close to an outer periphery thereof, an edge portion projecting in a substantially semicircular shape in cross section from a front surface as an outer peripheral edge portion; a head pulley which is formed of a tapered roller and driven by a motor; a tail pulley which is formed of a tapered roller having an angle same as a taper angle of the head pulley and driven in accordance with a rotation of the head pulley; an apparatus frame which pivotally supports the head pulley and the tail pulley in a state where a predetermined opening angle is provided between the pulleys and the pulleys are inclined so that an upper surface of the fan-shaped belt wound around the head pulley and the tail pulley becomes a horizontal surface; a plurality of guide wheel units which are provided to the apparatus frame along a vicinity of the outer peripheral edge portion of the fan-shaped belt and which pull the fan-shaped belt in a direction from a pivot to the outer periphery of the fan-shaped belt by sandwiching the outer peripheral edge portion of the fan-shaped belt wound around the head pulley and the tail pulley from a front side and a rear side; a bed which is horizontally supported to the apparatus frame by fixing a portion of the bed on the pivot side of the fan-shaped belt to the apparatus frame and a portion of the bed on the outer peripheral side of the fan-shaped belt to the apparatus frame from gaps between the plurality of guide wheel units by using support members, and which places the fan-shaped belt; and a pressing pulley which is arranged below the head pulley and presses the fan-shaped belt wound around the head pulley against the head pulley, in which the pressing pulley is a tapered roller having an angle same as the taper angle of the head pulley and having a length in a rotation axis direction of a tapered outer tube which is set to be shorter than a length in a rotation axis direction of a taper-shaped outer tube of the head pulley, and the pressing pulley prevents a slip between the head pulley and a rear surface of the fan-shaped belt which occurs when the head pulley rotates by being arranged in a state where a large-diameter-side end portion of the tapered outer tube is positioned in the vicinity of the outer peripheral edge portion of the fan-shaped belt and the pressing pulley is inclined so that a peripheral surface of the tapered outer tube presses a portion close to the outer periphery in a length from the pivot to the outer peripheral edge portion of the fan-shaped belt wound around the head pulley against a peripheral surface of the taper-shaped outer tube of the head pulley.

Further, the guide wheel unit has a first guide wheel which is abutted against each rear surface of the outer peripheral edge portion of the belt part on a forward side and a return side of the fan-shaped belt wound around the head pulley and the tail pulley; a first holding member holding the first guide wheel in a state rotatably supporting the first guide wheel around a horizontal axis at a portion which vertically rises when a lower end portion of the member is fastened to the apparatus frame; a second guide wheel which is abutted against a projection portion projecting to the front side of the outer peripheral edge portion of the belt part on the forward side of the fan-shaped belt from the pivot side of the fan-shaped belt; a second holding member which is fixed to an upper end portion of the first holding member in a state rotatably supporting the second guide wheel; a third guide wheel which is abutted against a projection portion projecting to the front side of the outer peripheral edge portion of the belt part on the return side of the fan-shaped belt from the pivot side of the fan-shaped belt; and a third holding member which is fixed to a portion of the apparatus frame where a lower end portion of the member is positioned on the pivot side of the fan-shaped belt of the first holding member in a state rotatably supporting the third guide wheel; and the guide wheel unit absorbs, by bending the portion of the first holding member which vertically rises, a variation of a pressing force on the second guide wheel which is pressed by the projection portion projecting to the front side of the outer peripheral edge portion of the belt part on the forward side due to a positional variation of the projection portion.

In this case, it is preferable that in the guide wheel unit, in order to optimize a pressing force on the third guide wheel which is pressed by the projection portion projecting to the front side of the outer peripheral edge portion of the belt part on the return side of the fan-shaped belt, the lower end portion of the third holding member is weakly fastened to the apparatus frame at the portion of the apparatus frame positioned on the pivot side of the belt part of the fan-shaped belt of the first holding member, and after that, the fan-shaped belt is previously driven, and after the third guide wheel is set to a position where it does not bite into the projection portion projecting to the front side of the outer peripheral edge portion of the belt part on the return side of the fan-shaped belt, the lower end portion of the third holding member is fastened and fixed to the apparatus frame.

Further, the first guide wheel can slide between a first position where the first guide wheel pulls together with the second guide wheel the fan-shaped belt in the outer peripheral direction of the fan-shaped belt while preventing coming-off of the outer peripheral edge portion of the belt part on the forward side of the fan-shaped belt and the first guide wheel pulls together with the third guide wheel the fan-shaped belt in the outer peripheral direction of the fan-shaped belt while preventing coming-off of the outer peripheral edge portion of the belt part on the return side of the fan-shaped belt, and a second position which is a position on an outer side than the first position in a radial direction of the fan-shaped belt and a position where the fan-shaped belt can be attached and detached; in the guide wheel unit, a collar is externally fitted around a rotation shaft of the first guide wheel at a position on an outside in the radial direction of the fan-shaped belt of the first guide wheel, and then the first guide wheel is pivotally supported by the first holding member in a slidable manner to a shaft fitting hole of the first holding member; and the guide wheel unit has a plate-shaped member attached to the rotation shaft of the first guide wheel which is abutted against the first holding member when the first guide wheel is at the first position, and moves to a position separated from the first holding member when the first guide wheel is slid from the first position to the second position, and a fastening member which fastens the plate-shaped member abutted against the first holding member to the first holding member and which holds the first guide wheel at the first position.

In this case, it is preferable that the fastening member is formed of a cylindrical member having a locking portion which is inserted into an insertion hole provided to the first holding member when the first guide wheel is moved from the second position to the first position; and a pressing member pressing out the locking portion of the cylindrical member toward an outside in a radial direction of the cylindrical member when pressed into the cylindrical member to make the locking portion of the cylindrical member locks in the insertion hole.

Further, a small-diameter-side end portion of the tapered outer tube of the pressing pulley, a small-diameter-side end portion of the taper-shaped outer tube of the head pulley, and a small-diameter-side end portion of a taper-shaped outer tube of the tail pulley, are pivotally supported by spherical bearings.

Further, a curved belt conveyor apparatus of the present invention is characterized in that it includes an endless fan-shaped belt including, at a position close to an outer periphery thereof, an edge portion projecting in a substantially semicircular shape in cross section from a front surface as an outer peripheral edge portion; a head pulley which is formed of a tapered roller and driven by a motor; a tail pulley which is formed of a tapered roller having an angle same as a taper angle of the head pulley and driven in accordance with a rotation of the head pulley; an apparatus frame which pivotally supports the head pulley and the tail pulley in a state where a predetermined opening angle is provided between the pulleys and the pulleys are inclined so that an upper surface of the fan-shaped belt wound around the head pulley and the tail pulley becomes a horizontal surface; guide wheel units which are provided in plural numbers to the apparatus frame along a vicinity of the outer peripheral edge portion of the fan-shaped belt and which pull the fan-shaped belt in a direction from a pivot to the outer periphery of the fan-shaped belt by sandwiching the outer peripheral edge portion of the fan-shaped belt wound around the head pulley and the tail pulley from a front side and a rear side; and a bed which is horizontally supported to the apparatus frame by fixing a portion of the bed on the pivot side of the fan-shaped belt to the apparatus frame and a portion of the bed on the outer peripheral side of the fan-shaped belt to the apparatus frame from gaps between the plurality of guide wheel units by using support members, and which places the fan-shaped belt, in which the guide wheel unit has a first guide wheel which is abutted against each rear surface of the outer peripheral edge portion of the belt part on a forward side and a return side of the fan-shaped belt wound around the head pulley and the tail pulley; a second guide wheel which is abutted against a projection portion projecting to the front side of the outer peripheral edge portion of the belt part on the forward side of the fan-shaped belt, from the pivot side of the fan-shaped belt; and a third guide wheel which is abutted against a projection portion projecting to the front side of the outer peripheral edge portion of the belt part on the return side of the fan-shaped belt from the pivot side of the fan-shaped belt; the first guide wheel can move between a first position where the first guide wheel pulls together with the second guide wheel the fan-shaped belt in the outer peripheral direction of the fan-shaped belt while preventing coming-off of the outer peripheral edge portion of the belt part on the forward side of the fan-shaped belt and the first guide wheel pulls together with the third guide wheel the fan-shaped belt in the outer peripheral direction of the fan-shaped belt while preventing coming-off of the outer peripheral edge portion of the belt part on the return side of the fan-shaped belt, and a second position which is a position on an outer side than the first position in a radial direction of the fan-shaped belt and a position where the fan-shaped belt can be attached and detached; and the guide wheel unit has a collar which is externally fitted onto a rotation shaft of the first guide wheel at a position on the outside in the radial direction of the fan-shaped belt of the first guide wheel in an axial direction of the rotation shaft of the first guide wheel; a first holding member holding the first guide wheel in a movable manner between the first position and the second position in a state where the collar externally fitted onto the rotation shaft of the first guide wheel is inserted therethrough; a plate-shaped member pivotally supporting the rotation shaft of the first guide wheel to which the collar is externally fitted and abutted against the first holding member when the first guide wheel is moved to the first position; a locking portion locking the first holding member when the first guide wheel is moved to the first position and makes the plate-shaped member to be held in a state of being abutted against the first holding member; and a fastening member fastening to the first holding member the plate-shaped member which is held in the state of being abutted against the first holding member by the locking portion.

Further, the locking portion is a locking piece provided to the plate-shaped member on a side of the first guide wheel of a member main body of the plate-shaped member with a predetermined interval provided to the member main body, and the plate-shaped member can turn, around the rotation shaft of the first guide wheel, between a locking position where a part of the first holding member is inserted into a gap generated between the locking piece and the member main body and sandwiches the part of the first holding member with the locking piece and the member main body, and a retreat position where the member retreats from the locking position and releases the sandwiching of the part of the first holding member sandwiched with the locking piece and the member main body.

In this case, it is preferable that the fastening member is a bolt screwed into a screw hole provided to the first holding member, the plate-shaped member has a groove portion into which a screw portion of the bolt temporarily screwed into the screw hole provided to the first holding member is inserted when the plate-shaped member is turned from the retreat position to the locking position, and the bolt can fasten the plate-shaped member to the first holding member in response to the insertion of the screw portion of the bolt into the groove portion of the plate-shaped member when the plate-shaped member is turned from the retreat position to the locking position.

Further, the collar is two collars with different outside diameters; the first holding member has an insertion hole in a shape of combining a small arc portion into which an upper end portion of the collar with smaller outside diameter among the two collars with different outside diameters is inserted, and a large arc portion having an inside diameter larger than an inside diameter of the small arc portion, and through which each of the two collars with different outside diameters can be inserted; the locking portion is a recessed portion formed by the two collars with different outside diameters and the plate-shaped member by abutting the plate-shaped member against the collar with smaller outside diameter among the two collars with different outside diameters; and by being inserted a peripheral edge portion of the small arc portion into the recessed portion when moving the first guide wheel to the first position, a part of the first holding member is sandwiched by the collar with larger outside diameter and the plate-shaped member.

In this case, it is preferable that the fastening member is a bolt screwed into a screw hole provided to the first holding member, the plate-shaped member has a groove portion into which a screw portion of the bolt temporarily fixed to the screw hole provided to the first holding member is inserted, the plate-shaped member can turn between a position where the screw portion of the bolt temporarily fixed to the screw hole provided to the first holding member is inserted into the groove portion and a position where the insertion of the screw portion of the bolt into the groove portion is released when the first guide wheel is at the first position, and the bolt can fasten the plate-shaped member to the first holding member in response to the turning of the plate-shaped member and the insertion of the screw portion of the bolt into the groove portion of the plate-shaped member.

Further, the first holding member holds the first guide wheel in a state rotatably supporting the first guide wheel around a horizontal axis at a portion which vertically rises when a lower end portion of the member is fastened to the apparatus frame and rotatably supports the second guide wheel at a tip portion when an upper end portion of the vertically risen portion is further bent a plurality of times.

Further, there is provided a second holding member which is fixed to a portion of the apparatus frame where a lower end portion of the member is positioned on the pivot side of the fan-shaped belt of the first holding member in a state rotatably supporting the third guide wheel; and in the guide wheel unit, in order to optimize a pressing force on the third guide wheel which is pressed by the projection portion projecting to the front side of the outer peripheral edge portion of the belt on the return side of the fan-shaped belt, the lower end portion of the second holding member is weakly fastened to the apparatus frame at the portion of the apparatus frame positioned on the pivot side of the belt part of the fan-shaped belt of the first holding member, and after that, the fan-shaped belt is previously driven, and after the third guide wheel is set to a position where it does not bite into the projection portion projecting to the front side of the outer peripheral edge portion of the belt part on the return side of the fan-shaped belt, the lower end portion of the second holding member is fastened and fixed to the apparatus frame.

Further, there is provided a pressing pulley which is arranged below the head pulley and presses the fan-shaped belt wound around the head pulley against the head pulley, in which the pressing pulley is a tapered roller having an angle same as the taper angle of the head pulley and having a length in a rotation axis direction of a tapered outer tube which is set to be shorter than a length in a rotation axis direction of a taper-shaped outer tube of the head pulley, and the pressing pulley prevents a slip between the head pulley and a rear surface of the fan-shaped belt which occurs when the head pulley rotates by being arranged in a state where a large-diameter-side end portion of the tapered outer tube is positioned in the vicinity of the outer peripheral edge portion of the fan-shaped belt and the pressing pulley is inclined so that a peripheral surface of the tapered outer tube presses a portion close to the outer periphery in a length from the pivot to the outer peripheral edge portion of the fan-shaped belt wound around the head pulley against a peripheral surface of the taper-shaped outer tube of the head pulley.

In this case, it is characterized in that a small-diameter-side end portion of the tapered outer tube of the pressing pulley, a small-diameter-side end portion of the taper-shaped outer tube of the head pulley, and a small-diameter-side end portion of a taper-shaped outer tube of the tail pulley are pivotally supported by spherical bearings.

Further, each of the first guide wheel, the second guide wheel, and the third guide wheel is a rolling bearing having an inner ring to which a center shaft is fitted and a portion which slides with the fan-shaped belt as an outer ring.

Further, the first guide wheel is formed of at least two or more rolling bearings arranged in parallel, each having an inner ring to which a center shaft is fitted and a portion which slides with the fan-shaped belt as an outer ring.

Effects

According to the present invention, by designing such that the pressing pulley which is arranged below the head pulley, is formed of the tapered roller having the angle same as the taper angle of the head pulley, and having the length in the rotation axis direction of the tapered outer tube, which is set to be shorter than the length in the rotation axis direction of the taper-shaped outer tube of the head pulley, and further, by arranging the pressing pulley in the state where the large-diameter-side end portion of the tapered outer tube is positioned in the vicinity of the outer peripheral edge portion of the fan-shaped belt, and in the state where the pressing pulley is inclined so that the peripheral surface of the tapered outer tube presses the portion close to the outer periphery in the length from the pivot to the outer peripheral edge portion of the fan-shaped belt wound around the head pulley, against the peripheral surface of the taper-shaped outer tube of the head pulley, it becomes possible to prevent the slip between the head pulley and the rear surface of the fan-shaped belt which occurs when the head pulley rotates. Further, by arranging the above-described pressing pulley, an influence of a stress in the pivot direction which acts due to the shape of the fan-shaped belt itself, and a deviation between the shape of the end pulleys and a turn-back shape of the fan-shaped belt wound around the end pulleys, can be reduced since the pressing pulley presses the portion close to the outer periphery in the length from the pivot to the outer peripheral edge portion of the fan-shaped belt, the portion receiving the greatest driving force from the head pulley, resulting in that the fan-shaped belt can be prevented from displacing in the inside diameter direction.

Further, in a belt conveyor apparatus for conveying a small-sized and light-weight conveyance object, for example, since small conveyance force is required, respective components with small size are used. Further, in order to make a small-sized conveyance object transfer between belt conveyors, it is required to use, as a head pulley and a tail pulley, tapered rollers each having a taper-shaped outer tube whose diameter of a small-diameter-side end portion and a diameter of a large-diameter-side end portion are relatively small, since there is a possibility of damaging the conveyance object at a transfer position. If such an end pulley is used, a center shaft of the end pulley becomes thin, and a bending amount of the pulley itself is large. Therefore, by arranging the above-described pressing pulley in the state where the large-diameter-side end portion of the tapered outer tube is positioned in the vicinity of the outer peripheral edge portion of the fan-shaped belt, and in the state where the pressing pulley is inclined so that the peripheral surface of the tapered outer tube presses the portion close to the outer periphery in the length from the pivot to the outer peripheral edge portion of the fan-shaped belt wound around the head pulley, against the peripheral surface of the tapered portion of the outer tube of the head pulley, it is possible to suppress the bending of the head pulley to be driven, and further, it becomes possible to stably travel the fan-shaped belt. Further, since the belt surface of the fan-shaped belt wound around the head pulley is pressed by the peripheral surface of the tapered outer tube of the pressing pulley, it is possible to suppress generation of a plurality of scratches on the surface of the fan-shaped belt, which occurs when using a straight pulley formed of a plurality of short pulleys arranged in parallel, resulting in that wear-out of the fan-shaped belt can be prevented.

Further, the guide wheel unit has: the first guide wheel against which the rear surface of the outer peripheral edge portion of the belt part on the forward side, and the rear surface of the outer peripheral edge portion of the belt part on the return side, of the fan-shaped belt wound around the head pulley and the tail pulley, are respectively abutted; the first holding member holding the first guide wheel at the portion which vertically rises when the lower end portion of the member is fastened to the apparatus frame, in the state of rotatably supporting the first guide wheel around the horizontal axis; the second guide wheel which is abutted against the projection portion projecting to the front side of the outer peripheral edge portion of the belt part on the forward side of the fan-shaped belt, from the pivot side of the fan-shaped belt; the second holding member which is fixed to the upper end portion of the first holding member in the state of rotatably supporting the second guide wheel; the third guide wheel which is abutted against the projection portion projecting to the front side of the outer peripheral edge portion of the belt part on the return side of the fan-shaped belt, from the pivot side of the fan-shaped belt; and the third holding member which is fixed to the portion, of the apparatus frame, where the lower end portion of the member is positioned further on the pivot side of the fan-shaped belt relative to the first holding member, in the state of rotatably supporting the third guide wheel, and the guide wheel unit absorbs the variation of the pressing force with respect to the second guide wheel which is pressed against the projection portion projecting to the front side of the outer peripheral edge portion of the belt part on the forward side, due to the positional variation of the projection portion, by bending the vertically risen portion of the first holding member. Accordingly, it is possible to hold the belt in a state where the projection portion of a thick edge portion positioned on the outer peripheral edge portion of the belt part on the forward side of the fan-shaped belt and the second guide wheel are constantly abutted against each other, resulting in that the displacement of the endless belt in the inside diameter direction can be minimized.

Further, the third guide wheel of the guide wheel unit is pressed against the projection portion projecting to the front side of the outer peripheral edge portion of the belt part on the return side of the fan-shaped belt, due to a reaction force, at the time of traveling the fan-shaped belt, and since the belt part on the return side of the fan-shaped belt is pushed out by the driven head pulley, to be a loose-side belt part, a stress in the inside diameter direction generated in the belt part on the return side of the fan-shaped belt is smaller than a stress generated in the belt part on the forward side, which is set to a tight side by the driving of the head pulley. Therefore, the pressing force with respect to the third guide wheel is small, and an amount of strain, depending on places, of the outer peripheral edge portion of the fan-shaped belt in the outside diameter direction of the fan-shaped belt, is small, so that by designing such that the lower end portion of the third holding member is weakly fastened to the apparatus frame at the portion, of the apparatus frame, positioned further on the pivot side of the fan-shaped belt relative to the first holding member, and after that, the fan-shaped belt is previously driven, and after the third guide wheel is set to a position at which it does not bite into the projection portion projecting to the front side of the outer peripheral edge portion on the return side of the fan-shaped belt, the lower end portion of the third holding member is fastened and fixed to the apparatus frame, it is possible to sufficiently perform adjustment. Consequently, the displacement of the endless belt in the inside diameter direction can be minimized.

Further, the first guide wheel which forms the guide wheel unit can slide between the first position where the first guide wheel pulls the fan-shaped belt in the outer peripheral direction of the fan-shaped belt while preventing the coming-off of the outer peripheral edge portion of the belt part on the forward side of the fan-shaped belt, together with the second guide wheel, and where the first guide wheel pulls the fan-shaped belt in the outer peripheral direction of the fan-shaped belt while preventing the coming-off of the outer peripheral edge portion of the belt part on the return side of the fan-shaped belt, together with the third guide wheel, and the second position which is at the position on the outside in the radial direction of the fan-shaped belt relative to the first position, and the position where the fan-shaped belt can be attached/detached, in the guide wheel unit, the collar is externally fitted around the rotation shaft of the first guide wheel, at the position on the outside in the radial direction of the fan-shaped belt, of the first guide wheel, and then the first guide wheel is pivotally supported by the first holding member in a slidable manner with respect to the shaft fitting hole of the first holding member, and the guide wheel unit has: the plate-shaped member attached to the rotation shaft of the first guide wheel, which is abutted against the first holding member when the first guide wheel is at the first position, and moves to the position separated from the first holding member when the first guide wheel is slid from the first position to the second position; and the fastening member which fastens the plate-shaped member abutted against the first holding member to the first holding member, to hold the first guide wheel at the first position. Accordingly, it becomes possible to attach/detach the fan-shaped belt without disassembling the guide wheel unit, which enables to improve maintainability.

Further, by forming the fastening member with: the cylindrical member having the locking portions which are inserted into the insertion hole provided to the first holding member when the first guide wheel is moved from the second position to the first position; and the pressing member pressing out, when it is pressed into the cylindrical member, the locking portions of the cylindrical member toward the outside in the radial direction of the cylindrical member, to make the locking portions of the cylindrical member lock in the insertion hole, it becomes possible to realize a simple configuration, and to improve a working efficiency when attaching/detaching the fan-shaped belt.

Further, by configuring such that the guide wheel unit having the first guide wheel, the second guide wheel, and the third guide wheel, is provided with: the collar which is externally fitted to the rotation shaft of the first guide wheel at the position on the outside in the radial direction of the fan-shaped belt, of the first guide wheel, in the axial direction of the rotation shaft of the first guide wheel; the first holding member holding the first guide wheel in a movable manner between the first position and the second position, in the state where the collar externally fitted to the rotation shaft of the first guide wheel is inserted therethrough; the plate-shaped member pivotally supporting the rotation shaft of the first guide wheel to which the collar is externally fitted, and abutted against the first holding member when the first guide wheel is moved to the first position; the locking portion locking the first holding member when the first guide wheel is moved to the first position, to make the plate-shaped member to be held in the state of being abutted against the first holding member; and the fastening member fastening the plate-shaped member which is held in the state of being abutted against the first holding member by the locking portion, to the first holding member, the position of the plate-shaped member with respect to the first holding member in the direction from the pivot side to the outer periphery of the fan-shaped belt is fixed, since the locking portion locking the first holding member when the first guide wheel is moved to the first position, to make the plate-shaped member to be held in the state of being abutted against the first holding member, and the fastening member fastening the plate-shaped member which is held in the state of being abutted against the first holding member by the locking portion, to the first holding member, are provided. Therefore, even if the stress in the direction from the pivot side to the outer periphery of the fan-shaped belt acts on the first guide wheel when traveling the fan-shaped belt, the state where the plate-shaped member is abutted against the first holding member, is maintained. Consequently, vibration of the plate-shaped member which occurs due to the above-described stress is prevented, resulting in that the fastening member which fastens the plate-shaped member to the first holding member can be prevented from being damaged.

Further, the small-diameter-side end portion of the tapered outer tube of the pressing pulley, the small-diameter-side end portion in the outer tube of the tapered part of the head pulley, and the small-diameter-side end portion in the outer tube of the tapered part of the tail pulley, are pivotally supported by the spherical bearings, so that it is possible to improve the accuracy at the time of attaching the respective pulleys to the apparatus frame, and to stably travel the fan-shaped belt wound around each of the head pulley and the tail pulley.

DETAILED DESCRIPTION OF THE EMBODIMENTS

Figure 1:
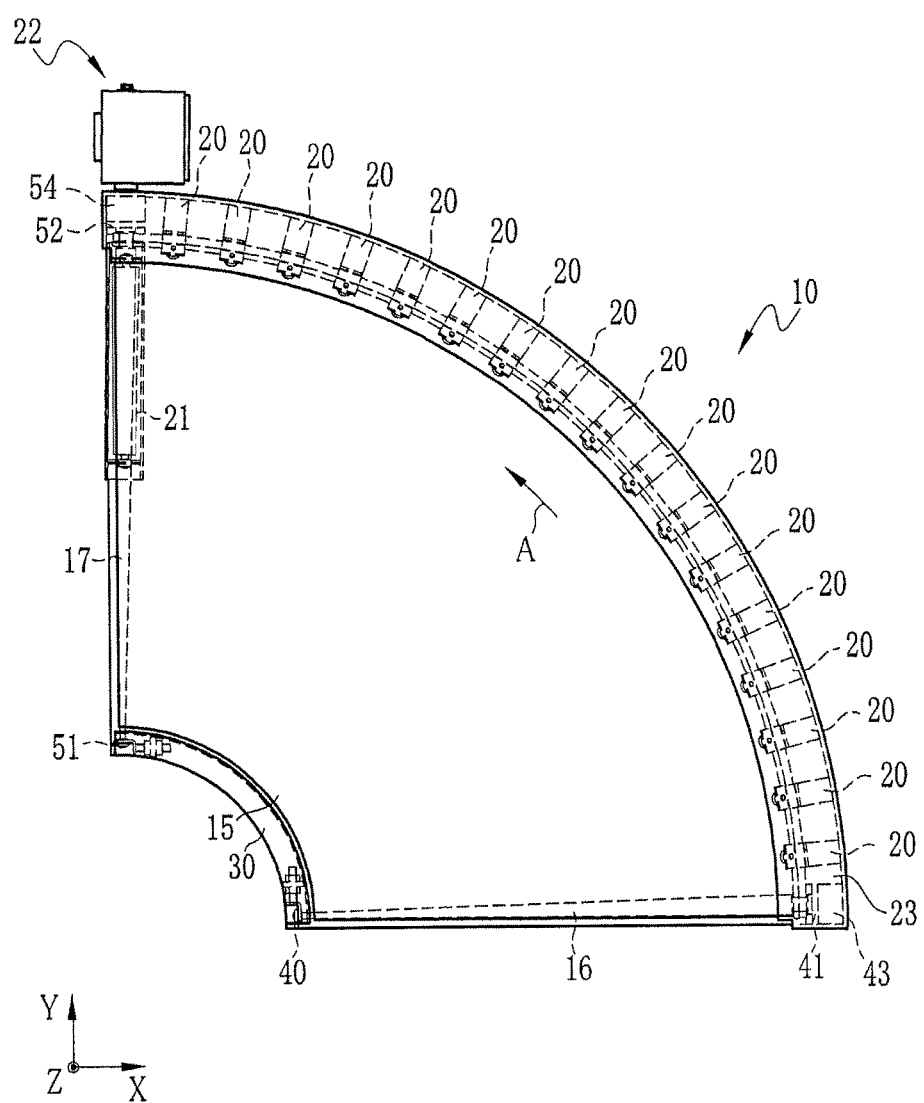
FIG. 1 is a top view illustrating one embodiment of a curved belt conveyor apparatus.

Hereinafter, embodiments of the present invention will be described based on the drawings. As illustrated in FIG. 1 to FIG. 5, a curved belt conveyor apparatus 10 supports an outer peripheral edge portion (profile) of an endless fan-shaped belt 15 wound around a tail pulley 16 and a head pulley 17 by using a large number of guide wheel units 20, to hold the fan-shaped belt 15 in a state where tension is given to the outer peripheral edge portion of the fan-shaped belt 15. The curved belt conveyor apparatus 10 described in the present embodiment is formed of a small-sized curved belt conveyor apparatus which conveys a relatively lightweight conveyance object (conveyance object whose weight is up to about 10 kg) such as food products or cosmetics, for example, and changes a conveyance direction of a conveyance object which is conveyed in a Y direction in FIG. 1 by a belt conveyor apparatus arranged on an upstream side, to a −X direction in FIG. 1 being a direction as a result of rotating the conveyance direction counterclockwise by 90 degrees.

The curved belt conveyor apparatus 10 has a configuration in which a pressing pulley 21, a driving unit 22, and the like, in addition to the aforementioned fan-shaped belt 15, tail pulley 16, head pulley 17, and guide wheel units 20, are assembled to an apparatus frame 14 to be a base part. Note that a reference numeral 23 denotes a cover which covers the guide wheel units 20 and the outer peripheral edge portion of the fan-shaped belt 15, to prevent entanglement of a conveyance object to be conveyed.

The apparatus frame 14 has a configuration in which cross members 26, 27, 28 are radially fixed between arc-shaped two angles 24, 25, having different lengths and curved so that their centers are located at the same position, and to upper surfaces of these, a fan-shaped floor plate 29 is fixed. At a position above the apparatus frame 14, a side plate 30, and a fan-shaped support plate (bed) 31 supporting a rear surface of a belt part on a forward side of the fan-shaped belt 15, are provided. The support plate 31 has an inner peripheral edge portion fixed to the side plate 30, and an outer peripheral edge portion supported by support members 34, 35, 36, 37. Consequently, the support plate 31 is held at a position above the floor plate 29, in a state of being separated from the floor plate 29 by a predetermined interval. Here, the support members 34, 35, 36, 37 are respectively fixed with a predetermine interval provided therebetween, via a support table (whose illustration is omitted) fixed to an outer peripheral edge portion of the floor plate 29. Note that each of the support members 34, 35, 36, 37 is arranged between adjacent guide wheel units 20, out of the guide wheel units 20 arranged with a predetermined angle interval provided therebetween.

The tail pulley 16 and the head pulley 17 are formed of tapered rollers whose taper angles of taper-shaped outer tubes are set to the same angle. In both end portions in an axial direction of each of the taper-shaped outer tubes of each of the tail pulley 16 and the head pulley 17, an end portion with large diameter is referred to as a large-diameter-side end portion, and an end portion with small diameter is referred to as a small-diameter-side end portion. Here, the diameter of the large-diameter-side end portion of the taper-shaped outer tube of the tail pulley 16 and the diameter of the large-diameter-side end portion of the taper-shaped outer tube of the head pulley 17 are the same, and the diameter of the small-diameter-side end portion of the taper-shaped outer tube of the tail pulley 16 and the diameter of the small-diameter-side end portion of the taper-shaped outer tube of the head pulley 17 are the same. Further, in each of the taper-shaped outer tubes of the tail pulley 16 and the head pulley 17, the diameter of the large-diameter-side end portion is set to 21.9 mm, for example, and the diameter of the small-diameter-side end portion is set to 6.3 mm, for example. The diameters may be set to ones with which a conveyance object is not largely shaken when it transfers to an upstream or downstream conveyor, in relation with a length of the conveyance object.

The tail pulley 16 and the head pulley 17 are arranged in a manner that rotation shafts of these pulleys are disposed with a predetermined opening angle provided therebetween, and further, the large-diameter-side end portions of the taper-shaped outer tubes of the respective pulleys are positioned on the side of the outer peripheral edge portion of the floor plate 29 (in other words, a position of the outer peripheral edge portion of the fan-shaped belt 15). If the taper angle of the taper-shaped outer tube of each of the tail pulley 16 and the head pulley 17 is set to 1.76 degrees, for example, an angle made by the rotation shaft of the tail pulley 16 and the rotation shaft of the head pulley 17, namely, the opening angle is set to 88.24 degrees, for example.

The tail pulley 16 is assembled to the apparatus frame 14 in a state where the rotation shaft positioned on the outside of the both end portions of the taper-shaped outer tube is supported by each of spherical bearings 40, 41. In the state where the tail pulley 16 is assembled to the apparatus frame 14, the tail pulley 16 is held in a state where its rotation axis direction is inclined downward by an angle of ½ of the taper angle with respect to a horizontal surface (0.88 degrees, for example), from the small-diameter-side end portion toward the large-diameter-side end portion of the taper-shaped outer tube.

The spherical bearing 40 which supports the rotation shaft positioned on the outside of the small-diameter-side end portion of the taper-shaped outer tube of the tail pulley 16, is held by a take-up unit 42 provided to an end portion on one end side of the side plate 30. Since the spherical bearing 40 is held by the take-up unit 42, it becomes possible to perform positional adjustment of the spherical bearing 40 (in other words, positional adjustment of the rotation shaft of the tail pulley 16). Further, the spherical bearing 41 which supports the rotation shaft positioned on the outside of the large-diameter-side end portion of the taper-shaped outer tube of the tail pulley 16, is held by a bracket 43 fixed to the outer peripheral edge portion of the floor plate 29 of the apparatus frame 14.

The head pulley 17 is assembled to the apparatus frame 14 in a state where the rotation shaft positioned on the outside of the both end portions of the taper-shaped outer tube is supported by each of spherical bearings 51, 52. In the state where the head pulley 17 is assembled to the apparatus frame 14, the head pulley 17 is held in a state where its rotation axis direction is inclined downward by an angle of ½ of the taper angle with respect to the horizontal surface (0.88 degrees, for example), from the small-diameter-side end portion toward the large-diameter-side end portion of the taper-shaped outer tube.

The spherical bearing 51 which supports the rotation shaft positioned on the outside of the small-diameter-side end portion of the taper-shaped outer tube of the head pulley 17, is held by a take-up unit 53 provided to an end portion, on the opposite side of the end portion, of the side plate 30, to which the spherical bearing 40 which supports the rotation shaft positioned on the outside of the small-diameter-side end portion of the taper-shaped outer tube of the tail pulley 16 is fixed. Since the spherical bearing 51 is held by the take-up unit 53, it becomes possible to perform positional adjustment of the spherical bearing 51 (in other words, positional adjustment of the rotation shaft of the head pulley 17). Further, the spherical bearing 52 which supports the rotation shaft positioned on the outside of the large-diameter-side end portion of the taper-shaped outer tube of the head pulley 17, is held by a bracket 54 fixed to the outer peripheral edge portion of the floor plate 29 of the apparatus frame 14.

Figure 5:
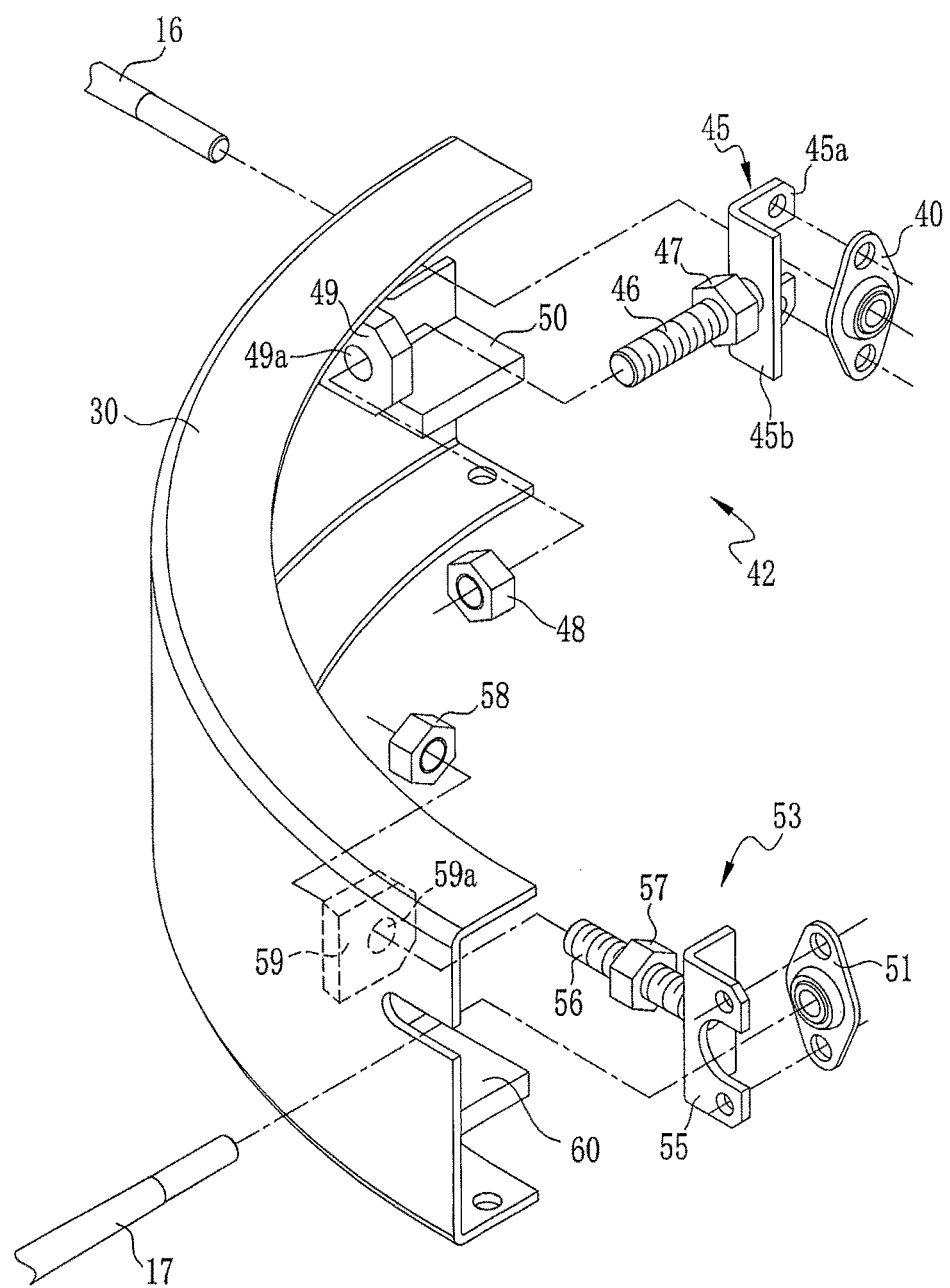
FIG. 5 is a perspective view illustrating one example of a configuration of a take-up unit.

The spherical bearing 40 which supports the rotation shaft positioned on the outside of the small-diameter-side end portion of the taper-shaped outer tube of the tail pulley 16 described above, is fixed to the take-up unit 42. As illustrated in FIG. 5, the take-up unit 42 is configured by an L-shaped bracket 45, a fully-threaded stud (threaded rod) 46, and two nuts 47, 48. To one piece 45a of the bracket 45, the spherical bearing 40 is fixed. A center portion in a longitudinal direction of the one piece 45a of the bracket 45 is cut out, and a part of the spherical bearing 40 is inserted into the cut-out portion. Further, to a center in the longitudinal direction of the other piece 45b of the bracket 45, one end of the fully-threaded stud 46 is firmly fixed by welding or the like.

In a state where the fully-threaded stud 46 into which the nut 47 is screwed is inserted through an insertion hole 49a of a support piece 49 provided to the side plate 30, the nut 48 is screwed into the stud, and the take-up unit 42 adjusts the position of the spherical bearing 40 by tightening the nuts 47, 48 with respect to the support piece 49. Note that a reference numeral 50 denotes a support piece supporting a lower surface of the bracket 45.

Further, the spherical bearing 51 which pivotally supports the small-diameter-side end portion of the taper-shaped outer tube of the head pulley 17, is fixed to the take-up unit 53. In a similar manner to the take-up unit 42, the take-up unit 53 is configured by an L-shaped bracket 55, a fully-threaded stud (threaded rod) 56, and two nuts 57, 58. Therefore, description regarding details of the take-up unit 53 will be omitted. In a state where the fully-threaded stud 56 into which the nut 57 is screwed is inserted through an insertion hole 59a of a support piece 59 provided to the side plate 30, the nut 58 is screwed into the stud, and the take-up unit 53 adjusts the position of the spherical bearing 51 by tightening the nuts 57, 58 with respect to the support piece 59. Note that a reference numeral 60 denotes a support piece supporting a lower surface of the bracket 55.

In the curved belt conveyor apparatus 10 of the present embodiment, by adjusting the position of the spherical bearing fixed to at least either of the aforementioned take-up unit 42 and take-up unit 53, through the tightening of the two nuts, it is possible to apply optimum tension to the fan-shaped belt 15 wound around the end pulleys 16, 17.

The driving unit 22 is assembled to the rotation shaft positioned on the outside of the large-diameter-side end portion of the taper-shaped outer tube of the head pulley 17. The driving unit 22 is formed of a motor (hollow shaft motor) 65, and a speed reducer 66, and a torque arm 67 provided to the driving unit 22 is fixed to a bracket 68 provided to the outer peripheral edge portion of the floor plate 29 of the apparatus frame 14, by using a bolt 69. Therefore, when the driving unit 22 is driven, the head pulley 17 rotates, and the fan-shaped belt 15 wound around the tail pulley 16 and the head pulley 17 travels in an A direction in FIG. 1.

Figure 2:
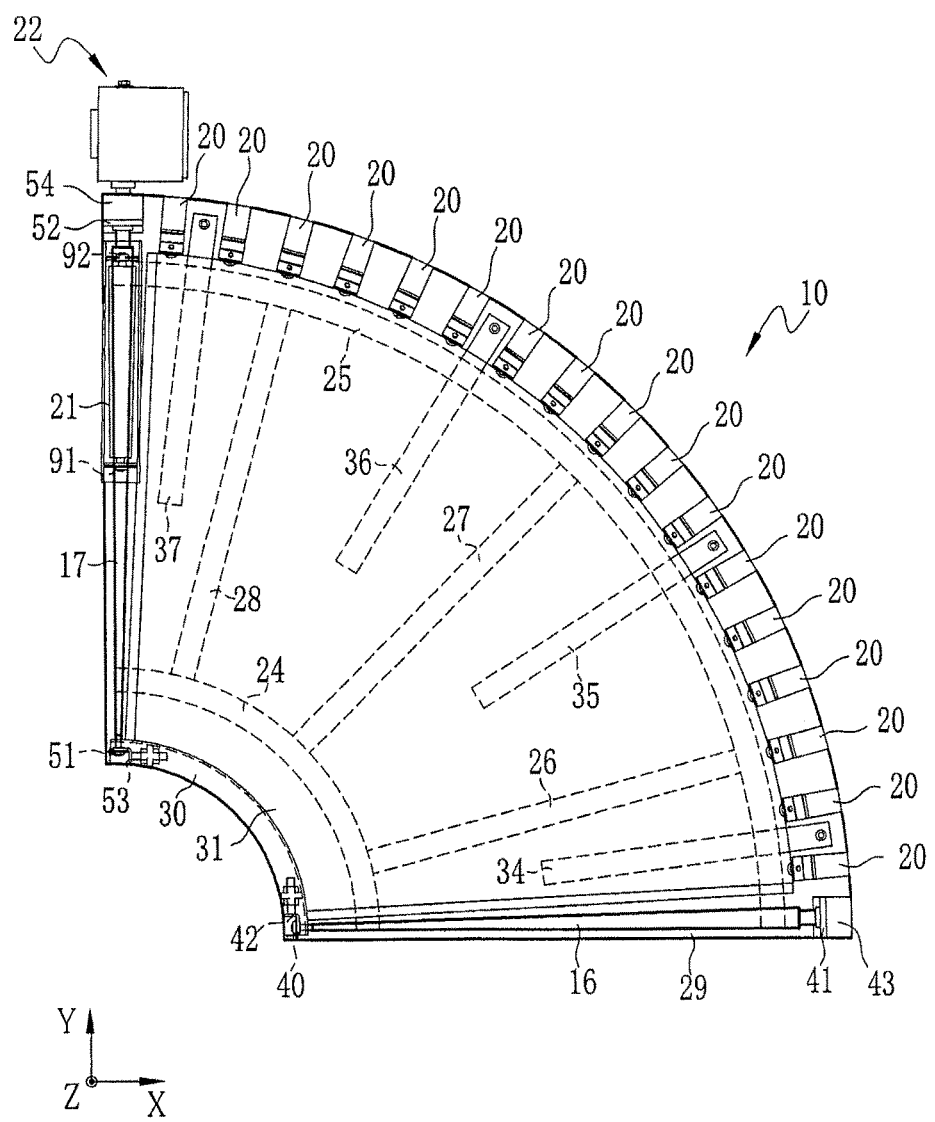
FIG. 2 is a top view illustrating an outline when a fan-shaped belt and a cover of the curved belt conveyor apparatus are removed.
Figure 3:
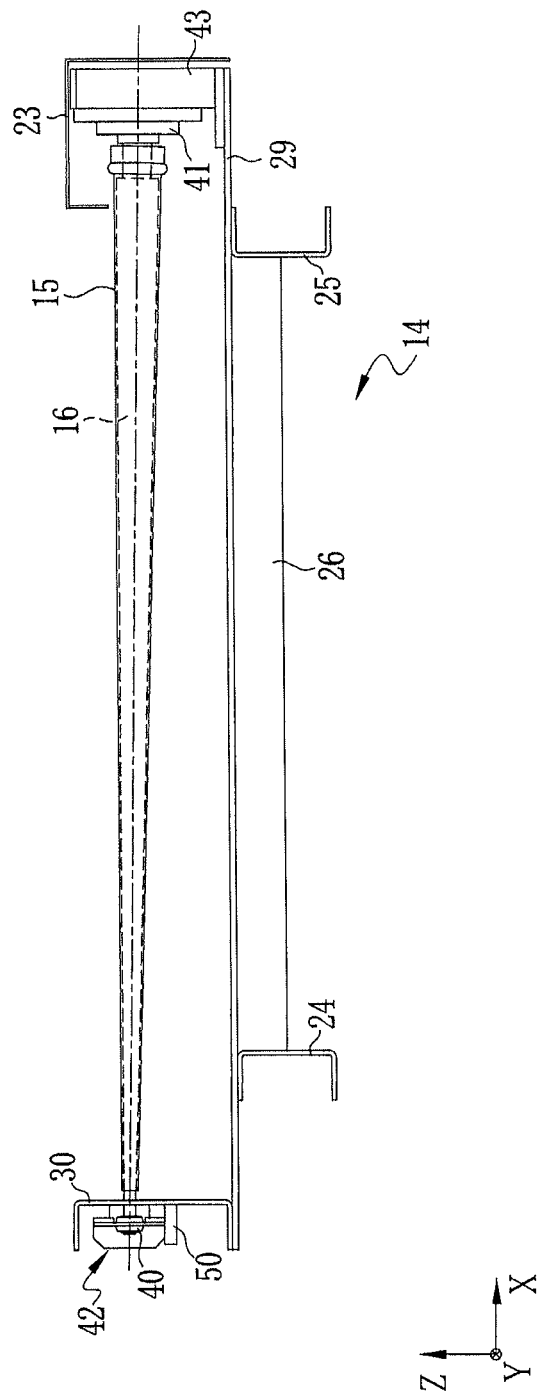
FIG. 3 is a side view when the curved belt conveyor apparatus is visually recognized from a tail pulley which is on a driven side.
Figure 4:
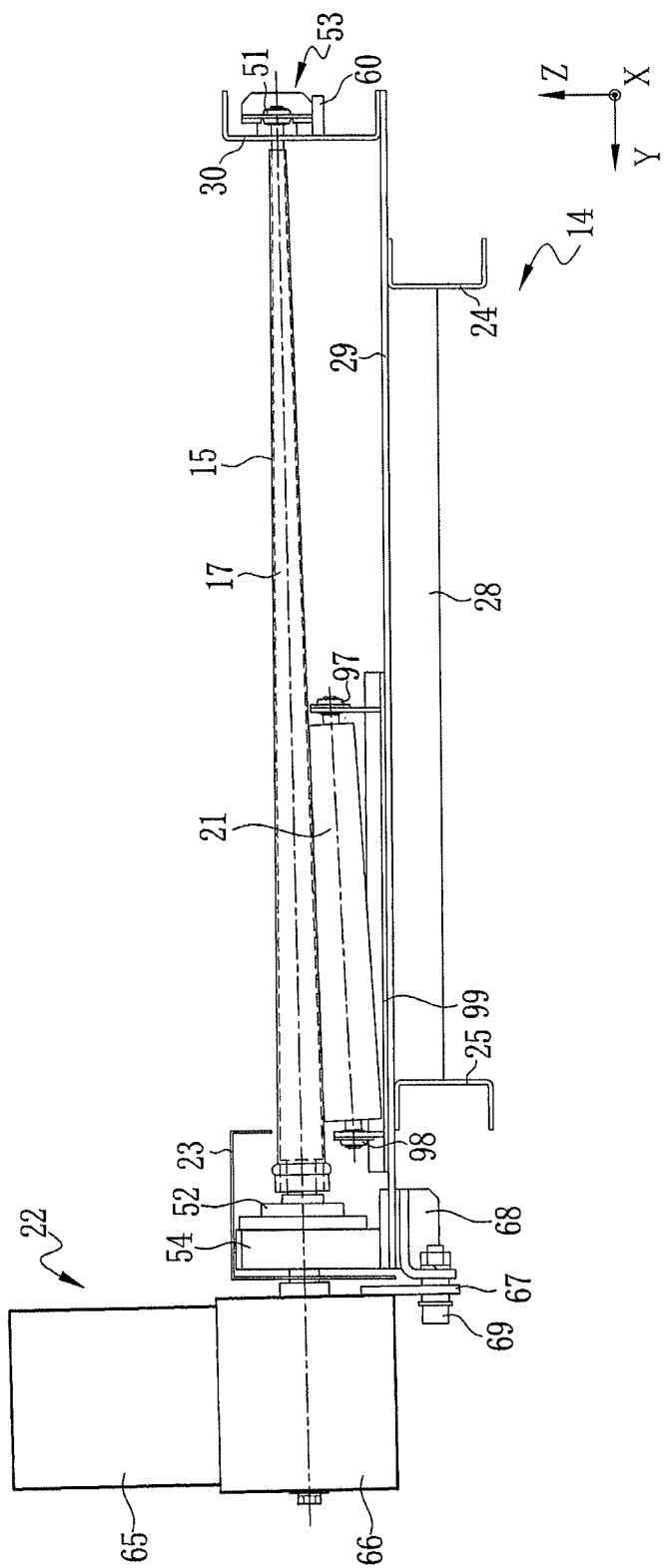
FIG. 4 is a side view when the curved belt conveyor apparatus is visually recognized from a head pulley which is on a driving side.

The guide wheel unit 20 sandwiches the outer peripheral edge portion of the fan-shaped belt 15 wound around the head pulley 17 and the tail pulley 16, from a front side and a rear side, to pull the fan-shaped belt 15 in a direction from a pivot to the outer periphery of the fan-shaped belt 15, thereby preventing the fan-shaped belt 15 from displacing to the pivot side thereof, when the fan-shaped belt 15 travels. The guide wheel units 20 are provided in plural numbers to the outer peripheral edge portion of the floor plate 29 of the apparatus frame 14 with the same angle interval provided therebetween, and along the outer peripheral edge portion of the fan-shaped belt 15. FIG. 2 illustrates a case where 17 pieces of guide wheel units 20 are provided along the outer peripheral edge portion of the fan-shaped belt 15. Note that a configuration of the guide wheel unit will be described later.

The pressing pulley 21 presses the fan-shaped belt 15 wound around the head pulley 17 against the head pulley 17. The pressing pulley 21 is arranged at a position on the outer peripheral edge portion side of the fan-shaped belt 15, and below the head pulley 17.

For the pressing pulley 21, a tapered roller whose diameter becomes small from the outer periphery toward the pivot side of the fan-shaped belt 15, is used. A taper angle of a tapered outer tube of the pressing pulley 21 is set to the same angle as the taper angle of the taper-shaped outer tube of each of the tail pulley 16 and the head pulley 17. The pressing pulley 21 is pivotally supported by the apparatus frame 14 in a state where it is inclined downward by the taper angle (17.6 degrees, for example) with respect to the rotation axis direction of the end pulley 17, from a small-diameter-side end portion toward a large-diameter-side end portion of the tapered outer tube. Specifically, a rotation shaft of the pressing pulley 21 is held in a state of being inclined by 24.6 degrees with respect to the horizontal surface. The pressing pulley 21 is fixed to a bracket 99 in a state where both end portions to be the rotation shaft thereof are supported by spherical bearings 97, 98. Note that a diameter of the small-diameter-side end portion of the tapered outer tube of the pressing pulley 21 is set to be larger than the diameter of the large-diameter-side end portion of the taper-shaped outer tube of each of the tail pulley 16 and the head pulley 17. For example, the diameter of the large-diameter-side end portion of the tapered outer tube of the pressing pulley 21 is set to 29 mm, for example, and the diameter of the small-diameter-side end portion of the tapered outer tube of the pressing pulley 21 is set to 22.9 mm, for example.

As described above, the diameter of the small-diameter-side end portion of the taper-shaped outer tube of each of the tail pulley 16 and the head pulley 17 is set to 6.3 mm, for example, and the diameter of the large-diameter-side end portion of the taper-shaped outer tube of each of the tail pulley 16 and the head pulley 17 is set to 21.9 mm, for example. Further, a length in the rotation axis direction of the taper-shaped outer tube of the head pulley 17 is set to 510 mm, for example. When the tapered roller having a relatively small diameter as described above is used for the curved belt conveyor apparatus, since the rotation shat has a small diameter, the pulley itself may be bent.

Therefore, it is desirable that the length in the rotation axis direction of the tapered outer tube of the pressing pulley 21 is set to the same length as the length in the rotation axis direction of the taper-shaped outer tube of the head pulley 17, and the fan-shaped belt 15 is pressed against the peripheral surface of the taper-shaped outer tube of the head pulley 17 by the peripheral surface of the tapered outer tube of the pressing pulley 21. However, when a thin tapered roller is used, it is difficult, in terms of design, to hold the pressing pulley 21 at a position below the head pulley 17. Therefore, the length in the rotation axis direction of the tapered outer tube of the pressing pulley 21 is set to be shorter than the length in the rotation axis direction of the taper-shaped outer tube of the head pulley 17. Specifically, when the length in the rotation axis direction of the taper-shaped outer tube of the head pulley 17 is set to 510 mm, for example, the length in the rotation axis direction of the tapered outer tube of the pressing pulley 21 is set to 200 mm, for example.

Next, a position of the pressing pulley 21 with respect to the head pulley 17 will be described. When the pressing pulley 21 whose length in the rotation axis direction is shorter than that of the head pulley 17 is used, the pressing pulley 21 is generally arranged so that it is abutted against a center portion in a width direction of the fan-shaped belt 15. When the pressing pulley 21 is arranged at the center portion in the width direction of the fan-shaped belt 15 or at a portion displaced from the center in the width direction to the pivot side of the fan-shaped belt 15, it is possible to suppress the occurrence of bending of the end pulley 17. However, when a stress in the direction from the outer periphery to the pivot (4.75 kg, for example), which is generated in the fan-shaped belt 15, is received only by the plurality of guide wheel units 20, the aforementioned stress is dispersed to each of the guide wheel units 20, but, a burden on each of the guide wheel units 20 is large. Therefore, in the present embodiment, the pressing pulley 21 is arranged at a position where the outer peripheral edge portion of the fan-shaped belt 15 can be pressed against the head pulley 17. This makes it possible to suppress the generation of slip between the head pulley 17 and the fan-shaped belt 15 wound around the head pulley 17, when the head pulley 17 rotates. Further, in addition to this, it is possible to suppress not only the bending which occurs on the head pulley 17, but also the burden on the guide wheel units 20 regarding the stress in the direction from the outer periphery to the pivot, generated in the fan-shaped belt 15.

Further, the curved belt conveyor apparatus 10 of the present embodiment uses the tapered roller as the pressing pulley 21. For example, the curved belt conveyor apparatus 10 generally uses a pressing pulley configured by a straight pulley formed of a plurality of short pulleys positioned in parallel, since a circumferential speed of the fan-shaped belt 15 is different depending on a position in a width direction. However, in such a pressing pulley, the short pulleys are individually abutted against a belt surface of the fan-shaped belt, so that a large number of scratches indicating that the belt surface is scratched, are generated, which leads to damage to the fan-shaped belt. Further, since the curved belt conveyor apparatus 10 of the present embodiment is intended to convey food products, cosmetics, or the like, as conveyance objects, it is not possible to use the pressing pulley which causes the above-described problems, in terms of hygiene. Therefore, in the present embodiment, by using the tapered roller for the pressing pulley 21, the above-described problems are solved, and further, the damage to the fan-shaped belt 15 is suppressed.

As described above, in the curved belt conveyor apparatus 10 exemplified in the present embodiment, when the fan-shaped belt 15 is traveled by the head pulley 17 which is rotated by the driving of the driving unit 22, the fan-shaped belt 15 wound around the head pulley 17 is sent out toward the tail pulley 16, while pressing the fan-shaped belt 15 against the head pulley 17 by using the pressing pulley 21 arranged below the head pulley 17. Therefore, it is possible to suppress the stress in the direction from the outer periphery to the pivot of the fan-shaped belt 15, which is generated in the fan-shaped belt 15 wound around the tail pulley 16 and the head pulley 17.

Hereinafter, the configuration of the guide wheel unit 20 provided to the curved belt conveyor apparatus 10 of the present invention will be described.

First Embodiment

Figure 6:
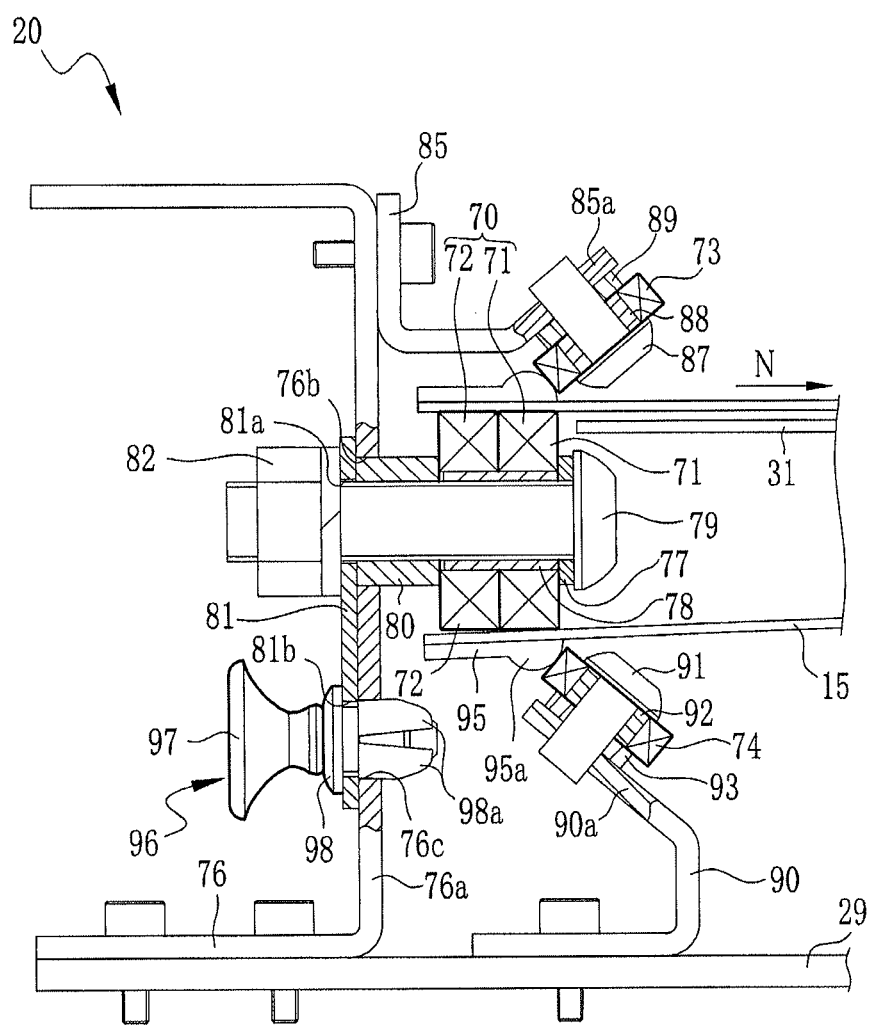
FIG. 6 is a sectional view illustrating a configuration of a guide wheel unit illustrated in a first embodiment.
Figure 7:
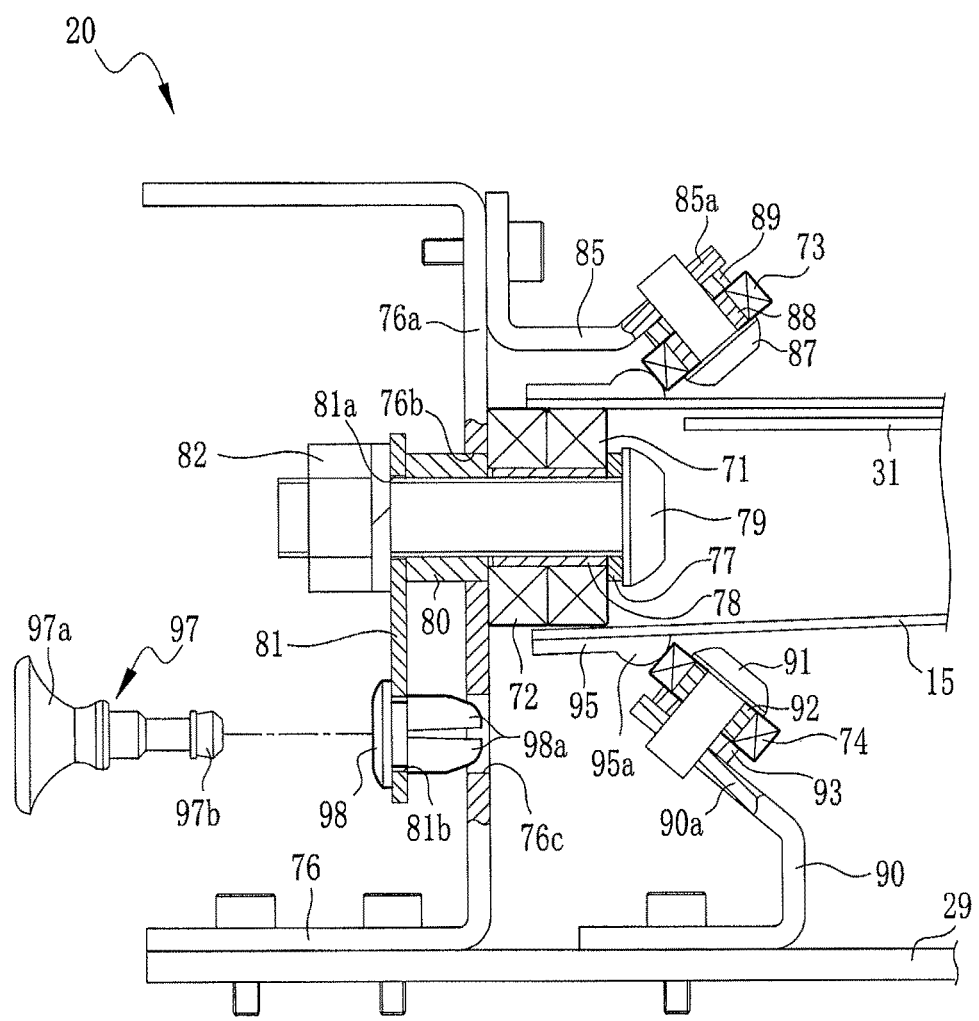
FIG. 7 is a sectional view illustrating a layout of the guide wheel unit when attaching/detaching the fan-shaped belt.

As illustrated in FIG. 6 and FIG. 7, the guide wheel unit 20 has a pair of guide wheels 70 abutted against each of a rear surface of the outer peripheral edge portion of the belt part on a forward side, and a rear surface of the outer peripheral edge portion of the belt part on a return side, of the fan-shaped belt 15. The pair of guide wheels 70 functions as a first guide wheel. The pair of guide wheels 70 is formed of guide wheels 71, 72. Further, the guide wheel unit 20 has: a guide wheel 73 abutted against a front surface of the outer peripheral edge portion of the belt part on the forward side of the fan-shaped belt 15; a guide wheel 74 abutted against a front surface of the outer peripheral edge portion of the belt part on the return side of the fan-shaped belt 15; and brackets holding these guide wheels (which correspond to brackets 76, 85, 90 to be described later). Here, the guide wheel 73 functions as a second guide wheel, and the guide wheel 74 functions as a third guide wheel. Note that for each of the guide wheels 71, 72, 73, 74, a rolling bearing (bearing) having an inner ring to which a center shaft is fitted, and a portion which slides with the fan-shaped belt 15 as an outer ring, for example, is used.

The guide wheels 71, 72 which form the pair of guide wheels 70 are rotatably held by the bracket 76 whose lower end portion is fixed (fastened) to the floor plate 29 of the apparatus frame 14. The bracket 76 includes a piece 76a which vertically rises when the lower end portion of the bracket is fixed to the apparatus frame 14, and the guide wheels 71, 72 are rotatably held by the piece 76a. The guide wheels 71, 72 are attached to a support bolt 79 inserted through a spacer 77 and a sleeve 78, in the order of the guide wheel 71 and the guide wheel 72, and a collar 80 is externally fitted to a tip of a screw portion of the support bolt 79. Under this state, the tip of the screw portion of the support bolt 79 is inserted through each of an insertion hole 76b provided to the bracket 76 and an insertion hole 81a of a holding plate 81, and then a nut 82 is screwed into the tip. Here, a diameter of the insertion hole 76b provided to the bracket 76 is formed to be slightly larger than an outside diameter of the collar 80, and it is designed such that the guide wheels 71, 72 held by the support bolt 79 can slide between a position where the holding plate 81 is abutted against the bracket 76 (a position illustrated in FIG. 6) and a position where a side surface of the guide wheel 72 is abutted against the bracket 76 (a position illustrated in FIG. 7), in an inside diameter direction of the fan-shaped belt 15 (in a direction from the outer periphery to the pivot of the fan-shaped belt 15) or in an outside diameter direction of the belt (in a direction from the pivot to the outer periphery of the fan-shaped belt 15). When manufacturing the curved belt conveyor apparatus 10, the holding plate 81 is held by the bracket 76 with a fastening member 96 to be described later, in a state of being abutted against the bracket 76. Further, when detaching the fan-shaped belt 15 of the curved belt conveyor apparatus 10, the fastening member 96 is removed, and then the holding plate 81 is slid from the position where it is abutted against the bracket 76 to the position where the side surface of the guide wheel 72 is abutted against the bracket 76, namely, a position separated from the bracket 76.

The guide wheel 73 is rotatably held by the bracket 85 made of a plate-shaped member whose left end portion illustrated in FIG. 6 is bent upward at a right angle and whose right end portion illustrated in FIG. 6 is bent upward at a predetermined angle. The guide wheel 73 is held by an inclined piece 85a of the bracket 85 by using a support bolt 87. A reference numeral 88 denotes a sleeve for preventing axial deflection when the guide wheel 73 rotates, and a reference numeral 89 denotes a collar which forms a gap between the guide wheel 73 and the inclined piece 85a to securely rotate the guide wheel 73. The bracket 85 which holds the guide wheel 73 is fixed to an upper end portion of the bracket 76 which holds the guide wheels 71, 72. Therefore, when the bracket 85 which holds the guide wheel 73 is fixed to the upper end portion of the bracket 76, the guide wheel 73 is held in a state where a gap is provided between an edge thereof and the front surface of the belt part on the forward side of the fan-shaped belt 15. In this state, the guide wheel 73 is abutted against a projection portion 95a of a thick edge portion 95 projecting to the front side of the outer peripheral edge portion of the belt part on the forward side of the fan-shaped belt 15, from the pivot side of the fan-shaped belt 15.

The guide wheel 74 is rotatably held by the bracket 90 made of a plate-shaped member in which a tip portion of one piece bent in an L-shape is bent toward the other piece side at a predetermined angle. The guide wheel 74 is held by an inclined piece 90a of the bracket 90 by using a support bolt 91. A reference numeral 92 denotes a sleeve for preventing axial deflection when the guide wheel 74 rotates, and a reference numeral 93 denotes a collar which forms a gap between the guide wheel 74 and the inclined piece 90a to securely rotate the guide wheel 74. Here, the bracket 90 which holds the guide wheel 74 is fixed to an upper surface of the floor plate 29. When the bracket 90 is fixed to the floor plate 29, the guide wheel 74 is held in a state where a gap is provided between an edge thereof and the front surface of belt of the belt part on the return side of the fan-shaped belt 15. In this state, the guide wheel 74 is abutted against the projection portion 95a of the thick edge portion 95 projecting to the front side of the outer peripheral edge portion of the belt part on the return side of the fan-shaped belt 15, from the pivot side of the fan-shaped belt 15.

Note that the guide wheel 74 is fastened to the floor plate 29 of the apparatus frame 14 in the following order. First, in order to optimize a pressing force with respect to the guide wheel 74 which is pressed against the projection portion 95a of the thick edge portion 95 projecting to the front side of the outer peripheral edge portion of the belt part on the return side of the fan-shaped belt 15, a lower end portion of the bracket 90 is weakly fastened to the apparatus frame 14, at a portion positioned on the pivot side of the fan-shaped belt 15. Further, the head pulley 17 is rotated to travel the fan-shaped belt 15, and then after the guide wheel 74 is set to a position at which it does not bite into the projection portion 95a of the thick edge portion 95 projecting to the front side of the outer peripheral edge portion of the belt part on the return side of the fan-shaped belt 15, the lower end portion of the bracket 90 is fastened and fixed to the apparatus frame 14.

The guide wheel unit 20 has, in addition to the above-described configuration, the fastening member 96 for holding the holding plate 81 at the position where the plate is abutted against the bracket 76. Hereinafter, explanation will be made by citing a case, as an example, where a NYLATCH (registered trademark) having a plunger 97 and a grommet 98 each formed of a synthetic resin material is used as the fastening member 96. The plunger 97 is a pin-shaped member of push-in type in which a head portion 97a enlarged in a flange shape is provided at one end side in an axial direction, and a bulging portion 97b with an enlarged diameter is provided at the other end side in the axial direction. Note that one end portion in the axial direction to which the bulging portion 97b with the enlarged diameter is provided, corresponds to an end portion to be locked in the grommet 98. The grommet 98 is formed in a shape of pipe in which the one end in the axial direction of the plunger 97 to which the bulging portion 97b is provided is inserted, and has a plurality of locking portions 98a which are pushed out to the outside in a radial direction when the bulging portion 97b of the plunger 97 is inserted into the grommet 98. The grommet 98 is held by the holding plate 81 in a state of being inserted through the insertion hole 81b provided to the holding plate 81.

For example, when the fan-shaped belt 15 is wound around the tail pulley 16 and the head pulley 17, the pair of guide wheels 70 is held at the position where the side surface of the guide wheel 72 is abutted against the bracket 76, and the holding plate 81 is held at the position where it is separated from the bracket 76 by a predetermined amount. In this state, tips of the plurality of locking portions 98a provided to the grommet 98 are inserted into the insertion hole 76c of the bracket 76. Note that a gap generated between the guide wheel 71 and the guide wheel 73 becomes a gap larger than a thickness of a portion, where the projection portion 95a is provided, of the thick edge portion 95 provided to the front side of the outer peripheral edge portion of the belt part on the forward side of the fan-shaped belt 15. Further, a gap generated between the guide wheel 71 and the guide wheel 74 becomes a gap larger than a thickness of a portion, where the projection portion 95a is provided, of the thick edge portion 95 provided to the front side of the outer peripheral edge portion of the belt part on the return side of the fan-shaped belt 15. Therefore, the fan-shaped belt 15 is wound around the tail pulley 16 and the head pulley 17, and then the outer peripheral edge portion of the belt part on the forward side of the fan-shaped belt 15 is inserted into the gap generated between the guide wheel 71 and the guide wheel 73. When the outer peripheral edge portion of the belt part on the forward side of the fan-shaped belt 15 is inserted into the gap generated between the guide wheel 71 and the guide wheel 73, there is created a state where the guide wheel 73 is abutted against the projection portion 95a of the thick edge portion 95 provided to the front side of the outer peripheral edge portion of the belt part on the forward side of the fan-shaped belt 15, from the pivot side of the fan-shaped belt 15.

Further, the outer peripheral edge portion of the belt part on the return side of the fan-shaped belt 15 is inserted into the gap generated between the guide wheel 71 and the guide wheel 74, in a similar manner. When the outer peripheral edge portion of the belt part on the return side of the fan-shaped belt 15 is inserted into the gap generated between the guide wheel 71 and the guide wheel 74, there is created a state where the guide wheel 74 is abutted against the projection portion 95a of the thick edge portion 95 provided to the front side of the outer peripheral edge portion of the fan-shaped belt 15. In this state, the bracket 90 which rotatably holds the guide wheel 74 is weakly fastened to the apparatus frame 14, since the pressing force with respect to the guide wheel 74 which is pressed against the projection portion 95a of the thick edge portion 95 projecting to the front side of the outer peripheral edge portion of the belt part on the return side of the fan-shaped belt 15, is not optimized. Under this state, the head pulley 17 is rotated to drive the fan-shaped belt 15, and then after the guide wheel 74 is set to a position at which it does not bite into the projection portion 95a of the thick edge portion 95 projecting to the front side of the outer peripheral edge portion of the belt part on the return side of the fan-shaped belt 15, the lower end portion of the bracket 90 is fastened and fixed to the apparatus frame 14.

After that, the holding plate 81 is moved to the position where it is abutted against the bracket 76. When the holding plate 81 is abutted against the bracket 76, the plurality of locking portions 98a provided to the grommet 98 held by the holding plate 81, are respectively inserted through the insertion hole 76c of the bracket 76. After the holding plate 81 is moved to the position where it is abutted against the bracket 76, the tip side of the plunger 97 is inserted into the grommet 98, and the head portion 97a of the plunger 97 is pushed into the bracket 76. When the head portion 97a of the plunger 97 is pushed into the bracket 76, the plurality of locking portions 98a provided to the grommet 98 are pushed out to the outside in the radial direction by the bulging portion 97b of the plunger 97 which is inserted into the grommet 98. Therefore, the plurality of locking portions 98a provided to the grommet 98 are pressed against an internal surface of the insertion hole 76c of the bracket 76. Consequently, there is created a state where the holding plate 81 is locked to the bracket 76.

In the state where the holding plate 81 is locked to the bracket 76, the gap generated between the guide wheel 71 and the guide wheel 73, and the gap generated between the guide wheel 71 and the guide wheel 74, respectively become smaller than those in the state before the holding plate 81 is locked to the bracket 76. Concretely, the gap generated between the guide wheel 71 and the guide wheel 73 is a gap which is larger than a thickness of a portion, where the thick edge portion 95 is not provided, of the outer peripheral edge portion of the fan-shaped belt 15, and which is smaller than a thickness of a portion, where the thick edge portion 95 is provided, of the fan-shaped belt 15, for example. Further, the gap generated between the guide wheel 71 and the guide wheel 74 is provided in a similar manner to the gap generated between the guide wheel 71 and the guide wheel 73. As a result of this, when the fan-shaped belt 15 is traveled, the state where the guide wheel 73 is abutted against the projection portion 95a of the thick edge portion 95 provided to the front side of the outer peripheral edge portion of the belt part on the forward side of the fan-shaped belt 15, from the pivot side of the fan-shaped belt 15, is maintained, and it becomes possible to prevent the outer peripheral edge portion of the belt part from coming off the gap generated between the guide wheel 71 and the guide wheel 73. In a similar manner, the state where the guide wheel 74 is abutted against the projection portion 95a of the thick edge portion 95 provided to the front side of the outer peripheral edge portion of the belt part on the return side of the fan-shaped belt 15, from the pivot side of the fan-shaped belt 15, is maintained, and it becomes possible to prevent the outer peripheral edge portion of the belt part from coming off the gap generated between the guide wheel 71 and the guide wheel 74.

On the other hand, when the fan-shaped belt 15 wound around the tail pulley 16 and the head pulley 17 is detached, the head portion 97a of the plunger 97 is pulled, to thereby pull out the plunger 97 from the grommet 98. When the plunger 97 of the fastening member 96 is pulled out from the grommet 98, each of the plurality of locking portions 98a pushed out by the bulging portion 97b of the plunger 97 is returned to its initial position, resulting in that the state where the outer peripheral portion of each of the locking portions 98a is pressed against the internal surface of the insertion hole of the bracket 76, is eliminated. Therefore, by pulling out the plunger 97 of the fastening member 96 from the grommet 98, it becomes possible to slide the holding plate 81 to the position where the side surface of the guide wheel 72 is abutted against the bracket 76.

In the state where the holding plate 81 is slid to the position where the side surface of the guide wheel 72 is abutted against the bracket 76, there is generated, at a position between the guide wheel 71 and the guide wheel 73, a gap larger than the thickness of the portion, where the projection portion 95a is provided, of the thick edge portion 95 provided to the outer peripheral edge portion of the belt part on the forward side of the fan-shaped belt 15. Further, at a position between the guide wheel 71 and the guide wheel 74, there is generated a gap larger than the thickness of the portion, where the projection portion 95a is provided, of the thick edge portion 95 provided to the outer peripheral edge portion of the belt part on the return side of the fan-shaped belt 15.

Therefore, the thick edge portion 95 provided to the front side of the outer peripheral edge portion of the belt part on the forward side of the fan-shaped belt 15 is pushed down to release the abutment between the projection portion 95a of the thick edge portion 95 provided to the front side of the outer peripheral edge portion of the belt part on the forward side of the fan-shaped belt 15 and the peripheral surface of the guide wheel 73, and then the outer peripheral edge portion of the fan-shaped belt 15 is pulled out from the gap generated between the guide wheel 71 and the guide wheel 73. At the same time, the thick edge portion 95 provided to the outer peripheral edge portion of the belt part on the return side of the fan-shaped belt 15 is pushed up to release the abutment between the projection portion 95a of the thick edge portion 95 provided to the outer peripheral edge portion of the belt part on the return side of the fan-shaped belt 15 and the peripheral surface of the guide wheel 74, and then the outer peripheral edge portion of the belt part on the return side of the fan-shaped belt 15 is pulled out from the gap generated between the guide wheel 71 and the guide wheel 74. Consequently, it becomes possible to perform attachment/detachment of the fan-shaped belt 15.

As described above, in the guide wheel unit 20, the peripheral surface of the guide wheel 73 is abutted against the projection portion 95a of the thick edge portion 95 provided to the front side of the outer peripheral edge portion of the belt part on the forward side of the fan-shaped belt 15, to press the rear side of the outer peripheral edge portion of the belt part on the forward side of the fan-shaped belt 15 against the guide wheels of the pair of guide wheels 70. In a similar manner, in the guide wheel unit 20, the peripheral surface of the guide wheel 74 is abutted against the projection portion 95a of the thick edge portion 95 provided to the front side of the outer peripheral edge portion of the belt part on the return side of the fan-shaped belt 15, to press the rear side of the outer peripheral edge portion of the belt part on the return side of the fan-shaped belt 15 against the guide wheels 71, 72 of the pair of guide wheels 70.

Here, the fan-shaped belt 15 is pulled by the head pulley 17 which rotates at the time of driving the curved belt conveyor apparatus 10. As described above, in the curved belt conveyor apparatus 10, the tail pulley 16 and the head pulley 17 are arranged with the predetermined opening angle provided therebetween, so that the stress in the direction from the outer periphery to the pivot of the fan-shaped belt 15 is generated in the belt. Therefore, the projection portion 95a of the thick edge portion 95 provided to the front side of the outer peripheral edge portion of the belt part on the forward side of the fan-shaped belt 15 is in a state of pressing the guide wheel 73.

For example, a case where the bracket 85 which rotatably holds the guide wheel 73 is fixed to a side frame or the like provided to the curved belt conveyor apparatus 10, is considered. In this case, when the projection portion 95a of the thick edge portion 95 provided to the front side of the outer peripheral edge portion of the belt part on the forward side of the fan-shaped belt 15, presses the guide wheel 73, the bracket 85 which holds the guide wheel 73 bents upward. Therefore, the guide wheel 73 moves upward. Here, if an assembling accuracy of the plurality of guide wheel units is poor, there are some guide wheel units, out of the plurality of guide wheel units, in each of which the projection portion 95a of the thick edge portion 95 provided to the front side of the outer peripheral edge portion of the belt part on the forward side of the fan-shaped belt 15 is not abutted against the guide wheel 73. In such a case, the stress in the direction from the outer periphery to the pivot of the fan-shaped belt 15 generated in the fan-shaped belt 15, is dispersed to some guide wheel units. Therefore, a bending amount of the bracket 85 which absorbs the stress in the direction from the outer periphery to the pivot of the fan-shaped belt 15 generated in the fan-shaped belt 15, the stress being applied to the guide wheel unit 20, becomes large. If the bending amount of the bracket 85 is large, the peripheral surface of the guide wheel 73 sometimes climbs over the projection portion 95a of the thick edge portion 95 provided to the front side of the outer peripheral edge portion of the fan-shaped belt 15, and as a result of this, the fan-shaped belt 15 is displaced in the pivot direction of the fan-shaped belt 15, which causes a slip between the head pulley 17 and the fan-shaped belt 15, and the fan-shaped belt 15 cannot be traveled.

In the curved belt conveyor apparatus 10 described in the first embodiment, the bracket 85 which rotatably holds the guide wheel 73 is fixed to the upper end portion of the bracket 76 which holds the pair of guide wheels 70. Here, when the bracket 85 which rotatably holds the guide wheel 73 is fixed to the upper end portion of the bracket 76 which holds the guide wheels 71, 72, and the projection portion 95a of the thick edge portion 95 provided to the front side of the outer peripheral edge portion of the belt part on the forward side of the fan-shaped belt 15 presses the guide wheel 73, the pressing force of the projection portion 95a of the thick edge portion 95 provided to the front side of the outer peripheral edge portion of the belt part on the forward side of the fan-shaped belt 15 exerts influence not only on the bracket 85 but also on the bracket 76.

Figure 8:
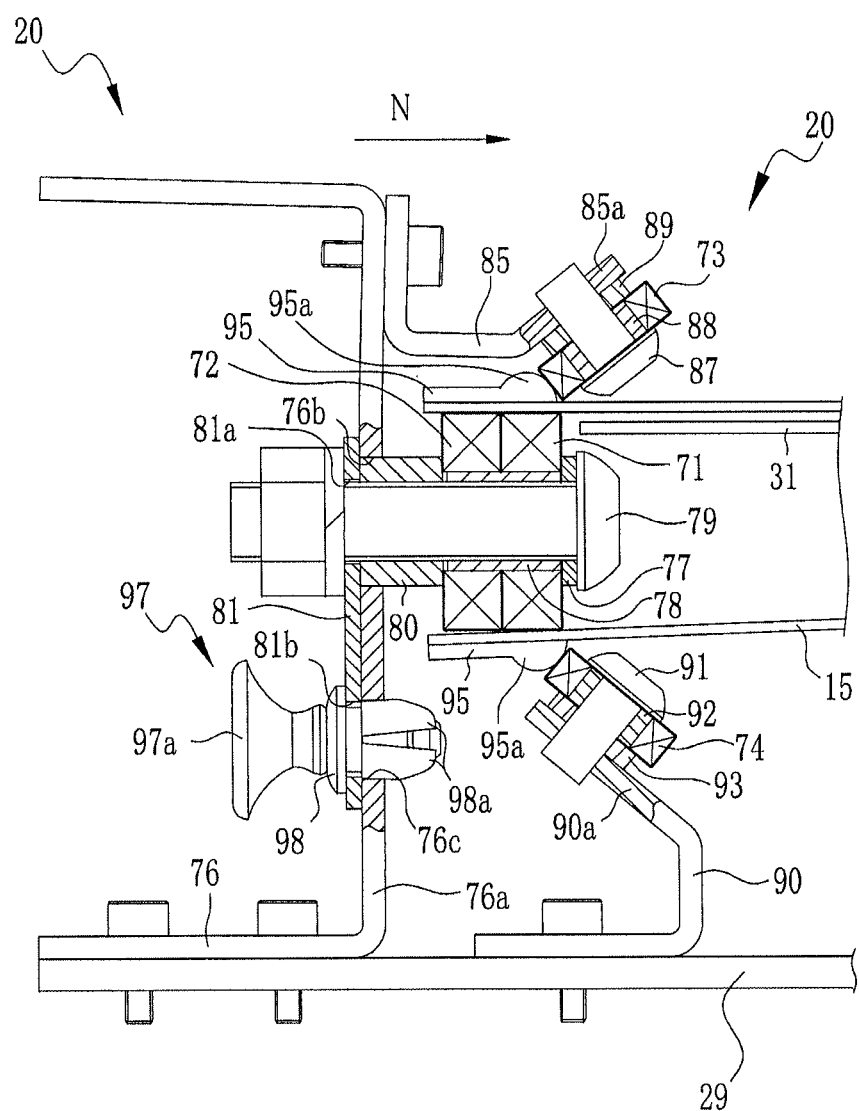
FIG. 8 is a sectional view illustrating a configuration of the guide wheel unit, in which a state where a third guide wheel is pressed against a projection portion of a thick edge portion of the fan-shaped belt is illustrated.

As illustrated in FIG. 8, if the guide wheel 73 receives a strong pressing force from the aforementioned projection portion 95a due to displacement of the projection portion 95a in the pivot direction, as a change in the projection portion 95a of the thick edge portion 95 provided to the front side of the outer peripheral edge portion of the belt part on the forward side of the fan-shaped belt 15, the upper end portion of the bracket 76 which holds the pair of guide wheels 70 is bent in the pivot direction of the fan-shaped belt 15 (N direction), to absorb the stress in the pivot direction of the fan-shaped belt 15 generated in the fan-shaped belt 15, the stress being applied to the guide wheel unit 20. In this case, since the upper end portion of the bracket 76 is bent, both of the guide wheels 71, 72 of the pair of guide wheels 70 move in the pivot direction of the fan-shaped belt 15 together with the support bolt 79, in accordance with the bending of the bracket 76, while changing an angle with respect to the horizontal surface. In this state, the abutment state between the peripheral surface of the guide wheel 73 and the projection portion 95a of the thick edge portion 95 provided to the front side of the outer peripheral edge portion of the belt part on the forward side of the fan-shaped belt 15, is maintained. Therefore, the guide wheel 73 can pull the outer peripheral edge portion of the belt part on the forward side of the fan-shaped belt 15 in the outside diameter direction of the fan-shaped belt 15.

Further, the guide wheel unit 74 is pressed by the projection portion 95a of the thick edge portion 95 provided to the front side of the outer peripheral edge portion of the belt part on the return side of the fan-shaped belt 15. Here, the belt part on the return side of the fan-shaped belt 15 is pushed out toward the end pulley 16 by the head pulley 17 which is rotated by the driving unit 22, so that a magnitude of tension applied to the belt part on the return side of the fan-shaped belt 15 is smaller than a magnitude of tension applied to the belt part on the forward side of the fan-shaped belt 15. Further, since the fan-shaped belt 15 is pressed against the head pulley 17 by the pressing pulley 21, in the state of being wound around the head pulley 17, the stress in the inside diameter direction applied to the belt part on the return side of the fan-shaped belt 15 is further reduced. Accordingly, since the bracket 90 which holds the guide wheel 74 is bent, it is possible to absorb the stress in the pivot direction of the fan-shaped belt 15 applied to the belt part on the return side of the fan-shaped belt 15. Therefore, the guide wheel 74 can pull the belt part on the return side of the fan-shaped belt 15 in the outside diameter direction of the fan-shaped belt 15.

As described above, when traveling the fan-shaped belt 15, the abutment state between the peripheral surface of the guide wheel 73 and the projection portion 95a of the thick edge portion 95 provided to the front side of the outer peripheral edge portion of the belt part on the return side of the fan-shaped belt 15, and the abutment state between the peripheral surface of the guide wheel 74 and the projection portion 95a of the thick edge portion 95 provided to the front side of the outer peripheral edge portion of the belt part on the forward side of the fan-shaped belt 15, are respectively maintained. Therefore, it becomes possible to prevent damage to the outer peripheral edge portion of the fan-shaped belt 15.

Further, in the guide wheel unit 20 of the present embodiment, the guide wheels 71, 72 of the pair of guide wheels 70 are arranged so that they are abutted against each of the rear side of the outer peripheral edge portion of the belt part on the forward side and the rear side of the outer peripheral edge portion of the belt part on the return side, of the fan-shaped belt 15. Therefore, it is possible to secure a region of supporting the rear surface of belt of the outer peripheral edge portion of the fan-shaped belt 15, and to prevent occurrence of flapping of the outer peripheral edge portion of the belt part on the forward side and the outer peripheral edge portion of the belt part on the return side, of the fan-shaped belt 15.

Further, at the outer peripheral edge portion of the fan-shaped belt 15, the plurality of guide wheel units 20 are arranged with the predetermined angle interval provided therebetween. For example, if the guide wheel 73 of a specific guide wheel unit 20 is fixed to the outside in the outside diameter direction of the fan-shaped belt 15, relative to the normal position, to the guide wheel 73 of the targeted guide wheel unit 20, an excessive stress compared to a stress with respect to the other guide wheel units 20, is applied. In the guide wheel unit 20 in the present embodiment, when the stress in the direction from the outer periphery to the pivot of the fan-shaped belt 15 is applied to the guide wheel 73, the bracket 76 which holds the guide wheels 71, 72 of the pair of guide wheels 70 is bent, resulting in that the stress from the fan-shaped belt 15 can also be applied, in a dispersed manner, to the other guide wheel units 20. Further, as described above, since the stress in the direction from the outer periphery to the pivot of the fan-shaped belt 15 generated in the fan-shaped belt 15, is reduced by the pressing pulley 21, the stress applied to each of the guide wheel units 20 can be suppressed, so that it is possible to prevent damage to the guide wheel unit 20 itself, and damage to the outer peripheral edge portion of the fan-shaped belt 15.

In the guide wheel unit 20 in the first embodiment, the guide wheels 71, 72 of the pair of guide wheels 70 can slide between the first position where the guide wheels pull the fan-shaped belt in the outer peripheral direction while preventing the coming-off of the outer peripheral edge portion of the belt part on the forward side of the fan-shaped belt 15, together with the guide wheel 73, and where the guide wheels pull the fan-shaped belt 15 in the outer peripheral direction while preventing the coming-off of the outer peripheral edge portion of the belt part on the return side of the fan-shaped belt, together with the guide wheel 74, and the second position which is at the position on the outside in the radial direction of the fan-shaped belt 15 relative to the first position, and the position where the fan-shaped belt 15 can be attached/detached.

However, on the front surface on the forward side and the front surface on the return side of the traveled fan-shaped belt 15, the stress in the inside diameter direction being a force by which the fan-shaped belt 15 is displaced in the inside diameter direction, naturally acts, as described above, but, on the rear surface on the forward side and the rear surface on the return side of the fan-shaped belt 15, the guide wheel 73 which abuts against the particularly highly-tensioned belt on the forward side, generates a reaction force toward the outside to prevent the displacement of the fan-shaped belt 15 toward the inside diameter side, so that on the guide wheels 71, 72 of the pair of guide wheels 70 accepting the stress, a stress in the outside diameter direction being the opposite direction of the inside diameter direction acts. The stress in the outside diameter direction exerts influence on the guide wheels 71, 72 of the pair of guide wheels 70 against which the rear surface on the forward side and the rear surface on the return side of the fan-shaped belt 15 are abutted, and the holding plate 81 which pivotally supports the guide wheels 71, 72 of the pair of guide wheels 70. Further, since the stress in the outside diameter direction changes depending on the presence/absence of the conveyance object, there is a possibility that the holding plate 81 on which the influence of the stress in the outside diameter direction is exerted vibrates to damage the fastening member 96 which fastens the holding plate 81 to the bracket 76.

Therefore, a configuration of a guide wheel unit preventing the vibration of the holding plate 81, which occurs when the fan-shaped belt 15 is traveled, and capable of preventing damage which occurs due to the vibration of the holding plate 81, will be described in a second embodiment. Since the configuration of the guide wheel unit is different, description will be made hereinafter by giving a reference numeral 20' to the guide wheel unit. Further, a pair of guide wheels functioning as the first guide wheel, and guide wheels functioning as the second and third guide wheels have configurations same as those of the first embodiment, and thus will be described with the same reference numerals as those of the first embodiment.

Second Embodiment

Figure 9:
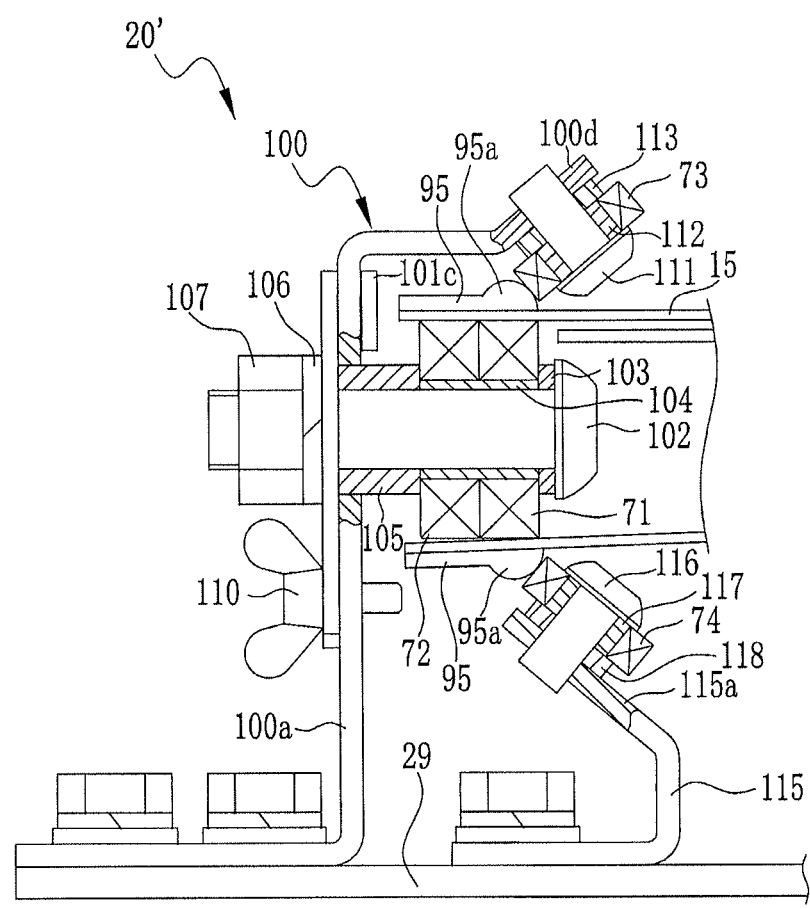
FIG. 9 is a view illustrating a configuration of a guide wheel unit illustrated in a second embodiment.
Figure 10:
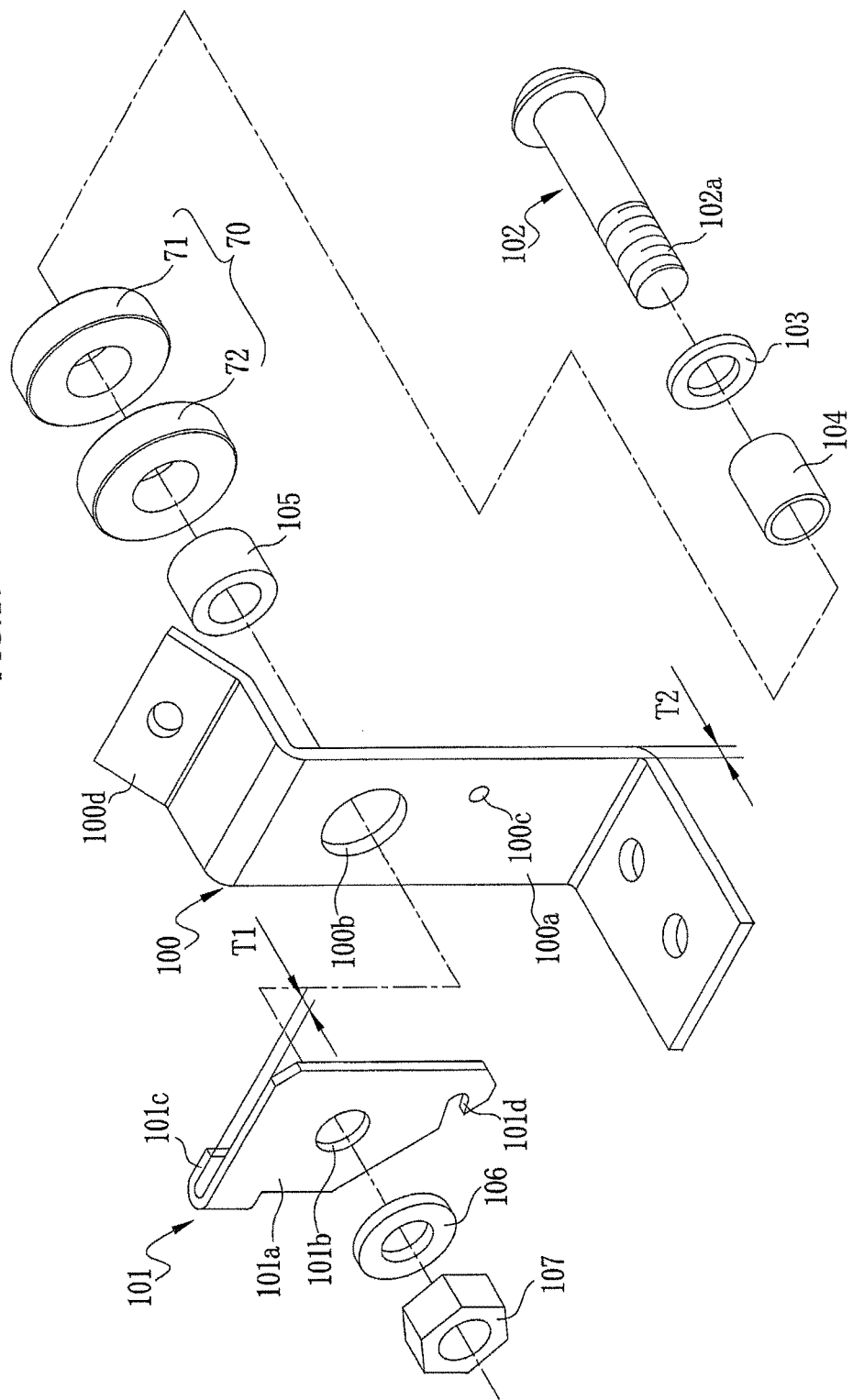
FIG. 10 is a view illustrating, in an exploded manner, a configuration in the vicinity of a bracket and a pair of guide wheels.

As illustrated in FIG. 9 and FIG. 10, the guide wheel unit 20' includes: the pair of guide wheels 70 being the first guide wheel abutted against each of the rear surface of the outer peripheral edge portion of the belt part on the forward side, and the rear surface of the outer peripheral edge portion of the belt part on the return side, of the fan-shaped belt 15; the guide wheel 73 being the second guide wheel abutted against the front surface of the outer peripheral edge portion of the belt part on the forward side of the fan-shaped belt 15; and the guide wheel 74 being the third guide wheel abutted against the front surface of the outer peripheral edge portion of the belt part on the return side of the fan-shaped belt 15. The pair of guide wheels 70 has the two guide wheels 71, 72. For each of the two guide wheels 71, 72 that form the pair of guide wheels 70, the guide wheel 73, and the guide wheel 74, a rolling bearing (bearing) having an inner ring to which a center shaft is fitted, and a portion which slides with the fan-shaped belt 15 as an outer ring, for example, is used.

A bracket 100 being the first holding member has a lower end portion fixed (fastened) to the floor plate of the apparatus frame 14. The bracket 100 has a holding piece 100*a* which rises in the vertical direction when the lower end portion of the bracket is fixed to the apparatus frame 14. The holding piece 100*a* of the bracket 100 has an insertion hole 100*b* through which a support bolt 102 being a rotation shaft of the pair of guide wheels 70 is inserted. Further, on the holding piece 100*a* of the bracket 100, a screw hole 100*c* into which a wing bolt 110 being a fastening member is screwed, is provided at a position below the insertion hole 100*b*.

A holding plate 101 being a plate-shaped member has an insertion hole 101*b* through which the support bolt 102 is inserted, at a center portion of a plate main body 101*a*. There is provided a locking piece 101*c* formed by folding back, by 180°, a tongue piece extended in the left direction in FIG. 10 from the plate main body 101*a* being a member main body of the plate-shaped member. A gap T1 between the locking piece 101*c* and the plate main body 101*a* is set to substantially the same as a thickness T2 of the bracket 100, for example. An insertion groove 101*d* is provided to a lower end portion of the plate main body 101*a*. In the insertion groove 101*d*, a screw portion 110*a* of the wing bolt 110 is inserted when the holding plate 101 is turned.

The above-described pair of guide wheels 70 is attached to the bracket 100 in the order to be described below. The pair of guide wheels 70 is attached, in the order of the guide wheel 71 and the guide wheel 72, to the support bolt 102 to which a spacer 103 and a sleeve 104 are externally fitted, and then a collar 105 is externally fitted to the support bolt 102. Under this state, a tip of the screw portion 102*a* of the support bolt 102 is inserted through the insertion hole 100*b* provided to the holding piece 100*a* of the bracket 100 and the insertion hole 101*b* of the holding plate 101, in this order. Further, a spacer 106 is externally fitted to the tip of the screw portion 102*a* of the support bolt 102, and then a nut 107 is screwed into the tip. In the state where the nut 107 is screwed into the screw portion 102*a* of the support bolt 102, the pair of guide wheels 70 is sandwiched by the spacer 103 and the collar 105, and further, the holding plate 101 is sandwiched by the collar 105 and the spacer 106. Here, it is also possible to employ rolling bearings formed by dividing the sleeve 104 into two, and integrating the divided pieces with the guide wheel 71 and the guide wheel 72, respectively. Note that although the sleeve 104 and the collar 105 are individually provided, it is also possible to employ a collar as a result of integrating these.

Figure 13:
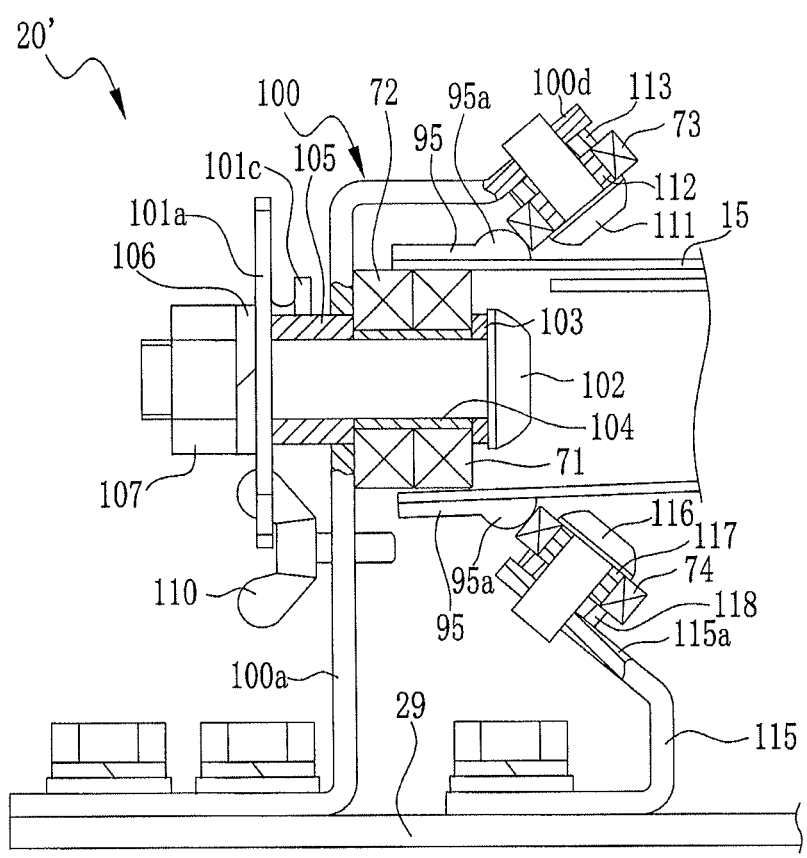
FIG. 13 is a view illustrating a configuration of the guide wheel unit at a replacement position (second position).

When manufacturing the curved belt conveyor apparatus 10, the pair of guide wheels 70 held by the bracket 100, is held at a working position being a first position. Further, when replacing the fan-shaped belt 15, the pair of guide wheels 70 is moved from the working position to a replacement position being a second position. Here, the working position indicates a position where the plate main body 101a of the holding plate 101 fixed to the support bolt 102 is abutted against the holding piece 100a of the bracket 100 (refer to FIG. 9). Further, the replacement position indicates a position where the plate main body 101a of the holding plate 101 fixed to the support bolt 102 is separated from the bracket 100 by a predetermined amount, and the side surface of the guide wheel 72 of the pair of guide wheels 70 is abutted against the bracket 100 (refer to FIG. 13).

Figure 11:
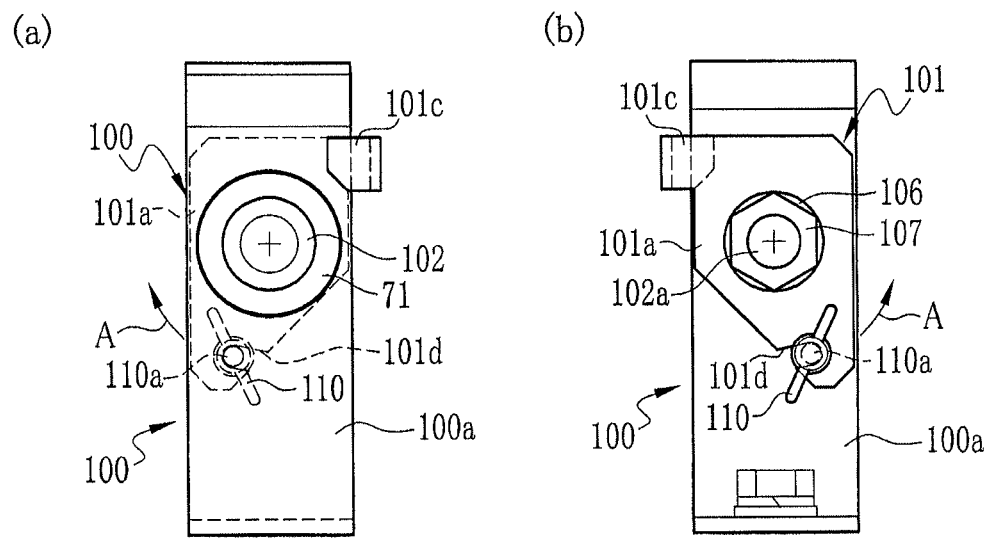
FIG. 11(a) is a view when a state in the vicinity of a holding plate at a fixing position (first position) is seen from a side of the pair of guide wheels.
FIG. 11(b) is a view when the state in the vicinity of the holding plate at the fixing position (first position) is seen from a side of the holding plate.
Figure 12:
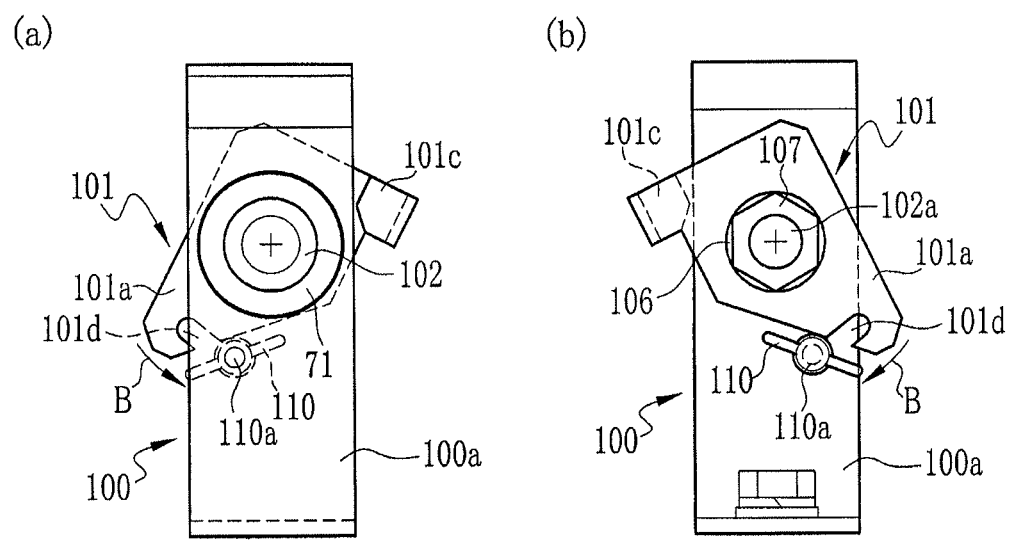
FIG. 12(a) is a view when a state in the vicinity of the bracket when the holding plate is at a slidable position is seen from the side of the pair of guide wheels.
FIG. 12(b) is a view when the state in the vicinity of the bracket when the holding plate is at the slidable position is seen from the side of the holding plate.

As illustrated in FIG. 11 and FIG. 12, when the pair of guide wheels 70 is at the working position, the holding plate 101 can turn between a position where a part of the bracket 100 is inserted into a gap between the plate main body 101a and the locking piece 101c, and the screw portion 110a of the wing bolt 110 is inserted into the insertion groove 101d of the holding plate 101 (referred to as a fixing position, hereinafter), and a position where the part of the bracket 100 is removed from the gap between the plate main body 101a and the locking piece 101c, and the screw portion 110a of the wing bolt 110 is removed from the insertion groove 101d of the holding plate 101 (referred to as a slidable position, hereinafter). When the holding plate 101 is at the fixing position, the part of the bracket 100 is inserted into the gap between the plate main body 101a and the locking piece 101c, and a relative position between the holding plate 101 and the bracket 100 in a direction from the pivot to the outer periphery of the fan-shaped belt 15, is kept constant. Specifically, the state where the holding plate 101 is abutted against the bracket 100 is maintained. When the holding plate 101 is at the fixing position, the wing bolt 110 which is temporarily fixed to the bracket 100 can be tightened.

On the other hand, when the holding plate 101 is at the fixing position, by loosening the tightened wing bolt 110, the holding plate 101 at the fixing position can be turned to the slidable position. When the holding plate 101 is turned to the slidable position, it becomes possible to slide and move the pair of guide wheels 70, together with the holding plate 101, between the working position and the replacement position.

Referring back to FIG. 9, the guide wheel 73 being the second guide wheel is rotatably held by an inclined piece 100d formed by bending an upper end portion of the bracket 100 downward in the vertical direction, and bending the vertically-bent tip portion upward at a predetermined angle. The guide wheel 73 is held by the inclined piece 100d of the bracket 100 by using a support bolt 111. A reference numeral 112 denotes a sleeve for preventing axial deflection when the guide wheel 73 rotates, and a reference numeral 113 denotes a collar which forms a gap between the guide wheel 73 and the inclined piece 100d to securely rotate the guide wheel 73. When the guide wheel 73 is pivotally supported by the inclined piece 100d of the bracket 100, the guide wheel 73 is held in a state where a gap is provided between an edge thereof and the front surface of the belt part on the forward side of the fan-shaped belt 15. In this state, the guide wheel 73 is abutted against the projection portion 95a of the thick edge portion 95 projecting to the front side of the outer peripheral edge portion of the belt part on the forward side of the fan-shaped belt 15, from the pivot side of the fan-shaped belt 15.

The guide wheel 74 being the third guide wheel is rotatably held by a bracket 115 being a second holding member made of a plate-shaped member in which a tip portion of one piece bent in an L-shape is bent toward the other piece side at a predetermined angle. The guide wheel 74 is held by an inclined piece 115a of the bracket 115 by using a support bolt 116. A reference numeral 117 denotes a sleeve for preventing axial deflection when the guide wheel 74 rotates, and a reference numeral 118 denotes a collar which forms a gap between the guide wheel 74 and the inclined piece 115a to securely rotate the guide wheel 74. Here, the bracket 115 which holds the guide wheel 74 is fixed to the upper surface of the floor plate. When the bracket 115 is fixed to the floor plate 29, the guide wheel 74 is held in a state where a gap is provided between an edge thereof and the front surface of belt of the belt part on the return side of the fan-shaped belt 15. In this state, the guide wheel 74 is abutted against the projection portion 95a of the thick edge portion 95 projecting to the front side of the outer peripheral edge portion of the belt part on the return side of the fan-shaped belt 15, from the pivot side of the fan-shaped belt 15.

Regarding the guide wheel 74, in order to optimize the pressing force with respect to the guide wheel 74 which is pressed against the projection portion of the thick edge portion projecting to the front side of the outer peripheral edge portion of the belt part on the return side of the fan-shaped belt 15, a lower end portion of the bracket 100 is weakly fastened to the apparatus frame 14, at a portion positioned on the pivot side of the fan-shaped belt 15. Further, the head pulley 17 is rotated to travel the fan-shaped belt, and then after the guide wheel 74 is set to a position at which it does not bite into the projection portion 95a of the thick edge portion 95 projecting to the front side of the outer peripheral edge portion of the belt part on the return side of the fan-shaped belt 15, the lower end portion of the bracket 100 is fastened and fixed to the floor plate 29 of the apparatus frame 14.

Hereinafter, a case where the fan-shaped belt 15 is wound around the tail pulley 16 and the head pulley 17, will be described. When the fan-shaped belt 15 is wound around the tail pulley 16 and the head pulley 17, the pair of guide wheels 70 is at the replacement position (refer to FIG. 13, for example). Specifically, the side surface of the guide wheel 72 of the pair of guide wheels 70 is abutted against the bracket 100, and the holding plate 101 is held at the position separated from the bracket 100 by the predetermined amount. At this time, a gap generated between the guide wheel 71 of the pair of guide wheels 70 and the guide wheel 73 becomes a gap larger than the thickness of the portion, where the projection portion 95a is provided, of the thick edge portion 95 provided to the front side of the outer peripheral edge portion of the belt part on the forward side of the fan-shaped belt 15. In like manner, a gap generated between the guide wheel 71 of the pair of guide wheels 70 and the guide wheel 74 becomes a gap larger than the thickness of the portion, where the projection portion 95a is provided, of the thick edge portion 95 provided to the front side of the outer peripheral edge portion of the belt part on the return side of the fan-shaped belt 15.

Therefore, the fan-shaped belt 15 is wound around the tail pulley 16 and the head pulley 17, and then the outer peripheral edge portion of the belt part on the forward side of the fan-shaped belt 15 is inserted into the gap generated between the pair of guide wheels 70 and the guide wheel 73. When the outer peripheral edge portion of the belt part on the forward side of the fan-shaped belt 15 is inserted into the gap generated between the pair of guide wheels 70 and the guide wheel 73, there is created a state where the guide wheel 73 is abutted against the projection portion 95a of the thick edge portion 95 provided to the front side of the outer peripheral edge portion of the belt part on the forward side of the fan-shaped belt 15, from the pivot side of the fan-shaped belt 15.

Further, in a similar manner, the outer peripheral edge portion of the belt part on the return side of the fan-shaped belt 15 is inserted into the gap generated between the pair of guide wheels 70 and the guide wheel 74. When the outer peripheral edge portion of the belt part on the return side of the fan-shaped belt 15 is inserted into the gap generated between the pair of guide wheels 70 and the guide wheel 74, there is created a state where the guide wheel 74 is abutted against the projection portion 95a of the thick edge portion 95 provided to the front side of the outer peripheral edge portion of the fan-shaped belt 15.

The bracket 100 which rotatably holds the guide wheel 74 is weakly fastened to the floor plate 29 of the apparatus frame 14, since the pressing force with respect to the guide wheel 74 which is pressed against the projection portion 95a of the thick edge portion 95 projecting to the front side of the outer peripheral edge portion of the belt part on the return side of the fan-shaped belt 15, is not optimized. The head pulley 17 is rotated to drive the fan-shaped belt 15, and then after the guide wheel 74 is set to the position at which it does not bite into the projection portion 95a of the thick edge portion 95 projecting to the front side of the outer peripheral edge portion of the belt part on the return side of the fan-shaped belt 15, the lower end portion of the bracket 100 is fastened and fixed to the floor plate 29 of the apparatus frame 14.

Next, the holding plate 101 is pressed toward the bracket 100, to thereby move the pair of guide wheels 70 from the replacement position to the working position. At this time, the holding plate 101 is held at the slidable position. After the pair of guide wheels 70 is moved from the replacement position to the working position, the holding plate 101 is turned from the slidable position toward the fixing position (in a B direction in FIG. 12). By the turning of the holding plate 101, the part of the bracket 100 is inserted into the gap between the plate main body 101a and the locking piece 101c. At the same time, the screw portion 110a of the wing bolt 110 is inserted into the insertion groove 101d. Under this state, the wing bolt 110 which is temporarily fixed to the bracket 100 is tightened, to thereby fix the holding plate 101 at the fixing position.

In the state where the pair of guide wheels 70 is held at the working position, the gap generated between the pair of guide wheels 70 and the guide wheel 73 is a gap which is larger than the thickness of the portion, where the thick edge portion 95 is not provided, of the outer peripheral edge portion of the fan-shaped belt 15, and which is smaller than the thickness of the portion, where the thick edge portion 95 is provided, of the fan-shaped belt 15, for example. Further, the gap generated between the pair of guide wheels 70 and the guide wheel 74 is provided in a similar manner to the gap generated between the pair of guide wheels 70 and the guide wheel 73. As a result of this, when the fan-shaped belt 15 is traveled, the state where the guide wheel 73 is abutted against the projection portion 95a of the thick edge portion 95 provided to the front side of the outer peripheral edge portion of the belt part on the forward side of the fan-shaped belt 15, from the pivot side of the fan-shaped belt 15, is maintained, and further, it becomes possible to prevent the outer peripheral edge portion of the belt part from coming off the gap generated between the pair of guide wheels 70 and the guide wheel 74. In a similar manner, the state where the guide wheel 73 is abutted against the projection portion 95a of the thick edge portion 95 provided to the front side of the outer peripheral edge portion of the belt part on the return side of the fan-shaped belt 15, from the pivot side of the fan-shaped belt 15, is maintained, and it becomes possible to prevent the outer peripheral edge portion of the belt part from coming off the gap generated between the pair of guide wheels 70 and the guide wheel 74.

Further, when detaching the fan-shaped belt 15 wound around the tail pulley 16 and the head pulley 17, the wing bolt 110 is loosened, and the holding plate 101 is turned from the fixing position toward the slidable position (in an A direction in FIG. 11). When the holding plate 101 is turned, the insertion groove 101d provided to the holding plate 101 is moved in a direction in which it separates from the screw portion 110a of the wing bolt 110, resulting in that the screw portion 110a of the wing bolt 110 is removed from the insertion groove 101d. Further, when the holding plate 101 is turned, the gap between the plate main body 101a and the locking piece 101c of the holding plate 101 is separated from the bracket 100. Therefore, the state where the holding piece 100a of the bracket 100 is sandwiched by the plate main body 101a and the locking piece 101c of the holding plate 101, is released (refer to FIG. 12).

Next, the pair of guide wheels 70 is moved from the working position to the replacement position. When the pair of guide wheels 70 is moved to the replacement position, there is generated, at a position between the pair of guide wheels 70 and the guide wheel 73, a gap larger than the thickness of the portion, where the projection portion 95a is provided, of the thick edge portion 95 provided to the outer peripheral edge portion of the belt part on the forward side of the fan-shaped belt 15. Therefore, the thick edge portion 95 provided to the front side of the outer peripheral edge portion of the belt part on the forward side of the fan-shaped belt 15 is pushed down to release the abutment between the projection portion 95a of the thick edge portion 95 provided to the front side of the outer peripheral edge portion of the belt part on the forward side of the fan-shaped belt 15 and the peripheral surface of the guide wheel 73. Subsequently, the outer peripheral edge portion of the belt part on the forward side of the fan-shaped belt 15 is pulled out from the gap generated between the pair of guide wheels 70 and the guide wheel 73.

Further, at the position between the pair of guide wheels 70 and the guide wheel 74, there is generated a gap larger than the thickness of the portion, where the projection portion 95a is provided, of the thick edge portion 95 provided to the outer peripheral edge portion of the belt part on the return side of the fan-shaped belt 15. Therefore, the thick edge portion 95 provided to the front side of the outer peripheral edge portion of the belt part on the return side of the fan-shaped belt 15 is pushed down to release the abutment between the projection portion 95a of the thick edge portion 95 provided to the front side of the outer peripheral edge portion of the belt part on the return side of the fan-shaped belt 15 and the peripheral surface of the guide wheel 74. Subsequently, the outer peripheral edge portion of the belt part on the return side of the fan-shaped belt 15 is pulled out from the gap generated between the pair of guide wheels 70 and the guide wheel 74. Consequently, it becomes possible to detach the fan-shaped belt 15.

Next, description regarding the time of working of the curved belt conveyor apparatus 10 will be made. In the guide wheel unit 20', the peripheral surface of the guide wheel 73 is abutted against the projection portion 95a of the thick edge portion 95 provided to the front side of the outer peripheral edge portion of the belt part on the forward side of the fan-shaped belt 15, to press the rear side of the outer peripheral edge portion of the belt part on the forward side of the fan-shaped belt 15 against the respective guide wheels 71, 72 of the pair of guide wheels 70. In like manner, in the guide wheel unit 20', the peripheral surface of the guide wheel 74 is abutted against the projection portion 95*a* of the thick edge portion 95 provided to the front side of the outer peripheral edge portion of the belt part on the return side of the fan-shaped belt 15, to press the rear side of the outer peripheral edge portion of the belt part on the return side of the fan-shaped belt 15 against the respective guide wheels 71, 72 of the pair of guide wheels 70.

The fan-shaped belt 15 is pulled by the head pulley 17 which rotates when the curved belt conveyor apparatus 10 is driven. As described above, in the curved belt conveyor apparatus 10, the tail pulley 16 and the head pulley 17 are arranged with the predetermined opening angle provided therebetween, so that in the fan-shaped belt 15, the stress in the direction from the outer periphery to the pivot is generated. Therefore, the projection portion 95*a* of the thick edge portion 95 provided to the front side of the outer peripheral edge portion of the belt part on the forward side of the fan-shaped belt 15 is in a state of pressing the guide wheel 73. In like manner, the projection portion 95*a* of the thick edge portion 95 provided to the front side of the outer peripheral edge portion of the belt part on the return side of the fan-shaped belt 15 is in a state of pressing the guide wheel 74.

The stress in the direction from the outer periphery to the pivot is generated in each of the front side of the belt part on the forward side, and the front side of the belt part on the return side of the fan-shaped belt 15, but, on the rear side of the belt part on the forward side and the rear side of the belt part on the return side of the fan-shaped belt 15, not the stress in the direction from the outer periphery to the pivot but the stress in the direction from the pivot side to the outer periphery acts. The pair of guide wheels 70 is pressed toward the bracket 100 side by the stress in the direction from the pivot side to the outer periphery, which is generated in the rear side of the belt part on the forward side and the rear side of the belt part on the return side of the fan-shaped belt 15.

As described above, when the holding plate 101 is held at the fixing position, there is created a state where the part of the holding piece 100*a* of the bracket 100 is inserted into the position between the plate main body 101*a* and the locking piece 101*c* of the holding plate 101. Further, the holding plate 101 is fastened to the bracket 100 by the wing bolt 110. As a result of this, even if the pair of guide wheels 70 is pressed toward the bracket 100 by the fan-shaped belt 15, the holding plate 101 does not vibrate, and the relative position of the holding plate 101 with respect to the bracket 100 in the direction from the pivot to the outer periphery of the fan-shaped belt 15 is kept constant. Specifically, the holding plate 101 is held in the state of being abutted against the bracket 100.

As described above, operations to be performed with respect to the guide wheel unit 20' in the working of detaching the fan-shaped belt 15, include an operation of turning the holding plate 101 from the fixing position to the slidable position after performing an operation of loosening the wing bolt 110 screwed into the bracket 100, and an operation of sliding the pair of guide wheels 70 from the working position to the replacement position. Further, as operations to be performed with respect to the guide wheel unit 20' in the working of attaching the fan-shaped belt 15, it is only required to perform an operation of moving the pair of guide wheels 70 from the replacement position to the working position, an operation of turning the holding plate 101 from the slidable position to the fixing position, and then an operation of tightening the wing bolt 110 screwed into the bracket 100. Therefore, it is possible to simplify the operations related to the working of replacement of the fan-shaped belt 15, and to improve the working efficiency in the working of replacement of the fan-shaped belt 15.

In the second embodiment, it is configured to lock the bracket 100 by inserting the part of the bracket 100 into the gap between the locking piece 101*c* provided to the holding plate 101 and the plate main body 101*a* of the holding plate 101, when the holding plate 101 is turned, but, the configuration of locking the bracket is not limited to one described in the second embodiment. As will be described below, it is also possible to configure such that a collar to be externally fitted to a support bolt is formed to have a shape of combining a cylindrical portion with large outside diameter (a large diameter portion) and a cylindrical portion with small outside diameter (a small diameter portion), and a part of the bracket is inserted into a recessed portion formed by the collar and a holding plate when the small diameter portion of the collar externally fitted to the support bolt is abutted against the holding plate. Hereinafter, a case of employing the above configuration will be described as a third embodiment.

Third Embodiment

In a configuration of a guide wheel unit in the third embodiment to be described below, a collar externally fitted to a support bolt being a rotation shaft of the first guide wheel, a holding plate and a bracket being a part of the first holding member, are different from those of the second embodiment. Therefore, the collar, the holding plate, and the bracket will be described with different reference numerals, and parts common to those of the second embodiment will be described with the same reference numerals as those of the second embodiment. Further, since the collar, the holding plate, and the bracket have different configurations, the guide wheel unit will be described with a reference numeral 20".

Figure 14:
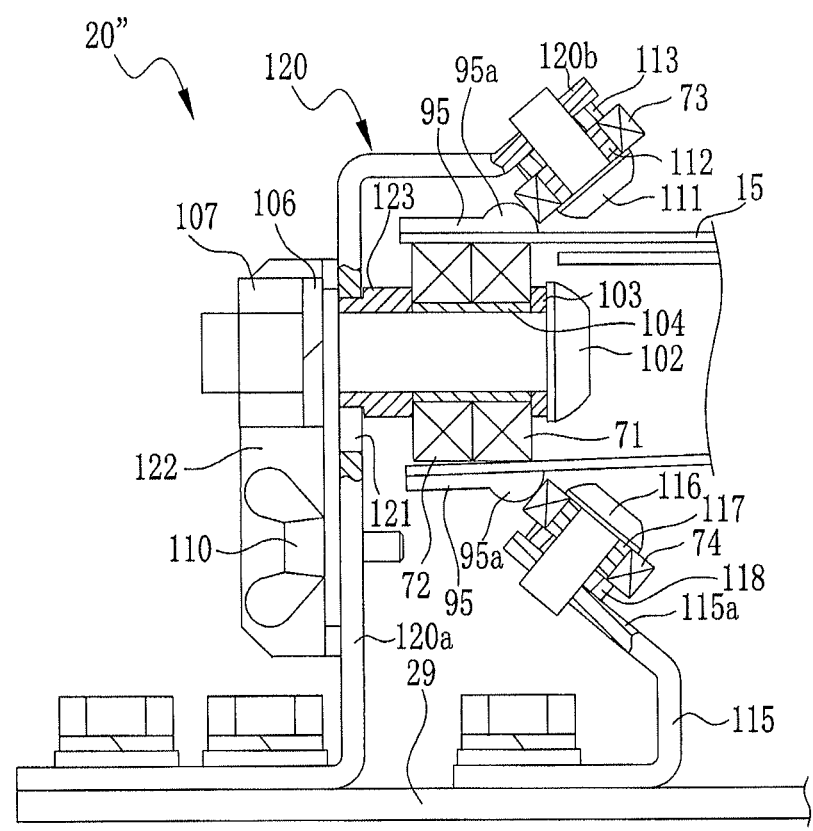
FIG. 14 is a view illustrating a configuration of a guide wheel unit described in a third embodiment.
Figure 15:
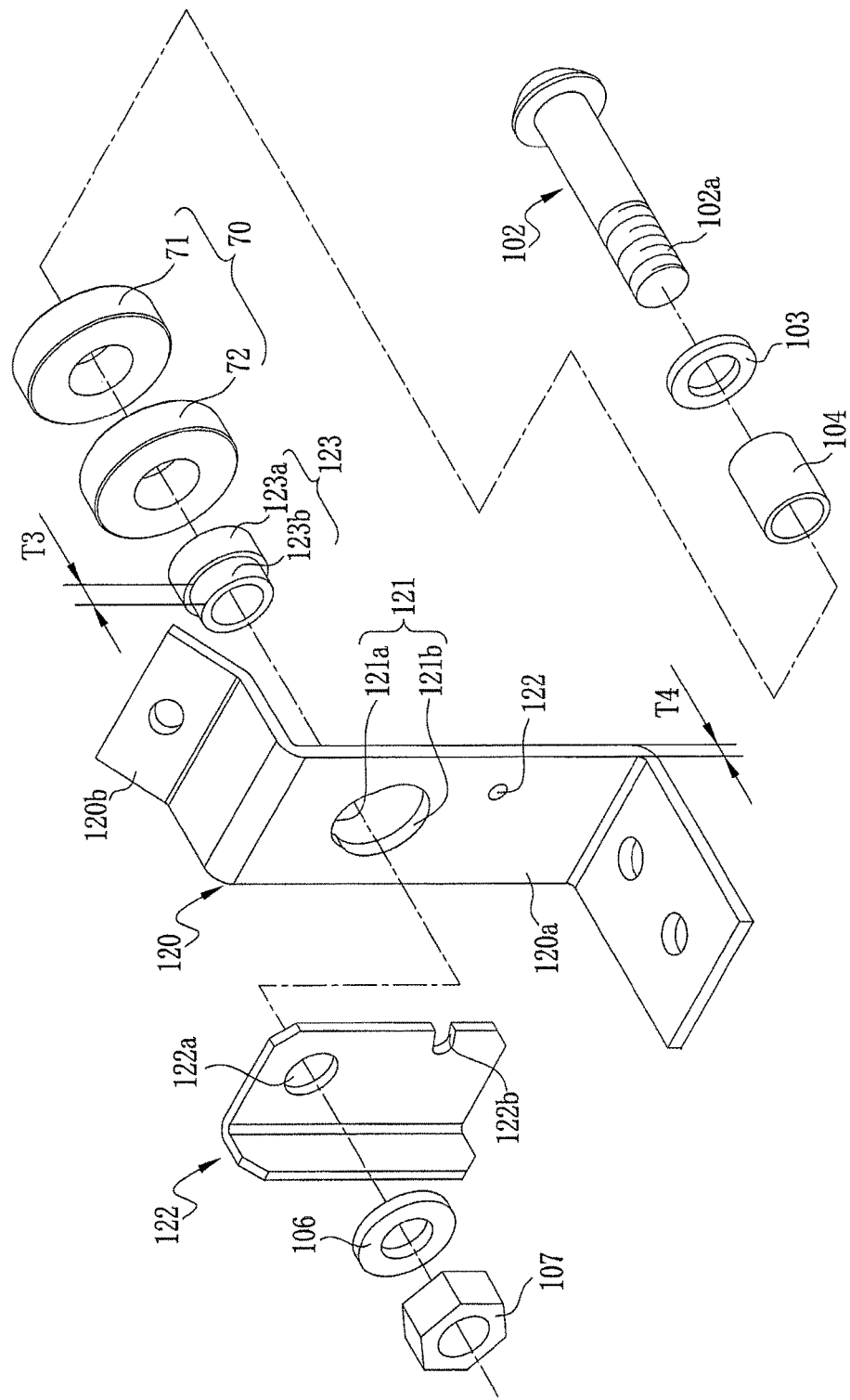
FIG. 15 is a view illustrating, in an exploded manner, a configuration in the vicinity of a bracket and a pair of guide wheels.

As illustrated in FIG. 14 and FIG. 15, the guide wheel unit 20" described in the third embodiment includes, in a similar manner to the guide wheel unit 20 described in the first embodiment and the guide wheel unit 20' described in the second embodiment, the pair of guide wheels 70 abutted against each of the rear surface of the outer peripheral edge portion of the belt part on the forward side, and the rear surface of the outer peripheral edge portion of the belt part on the return side, of the fan-shaped belt 15, the guide wheel 73 abutted against the front surface of the outer peripheral edge portion of the belt part on the forward side of the fan-shaped belt 15, and the guide wheel 74 abutted against the front surface of the outer peripheral edge portion of the belt part on the return side of the fan-shaped belt 15. The pair of guide wheels 70 functions as the first guide wheel, the guide wheel 73 functions as the second guide wheel, and the guide wheel 74 functions as the third guide wheel.

A bracket 120 being the first holding member has a lower end portion fixed (fastened) to the floor plate 29 of the apparatus frame 14. The bracket 120 has a holding piece 120*a* which rises in the vertical direction when the lower end portion of the bracket is fixed to the apparatus frame 14. The holding piece 120*a* of the bracket 120 has an insertion hole 121 through which the support bolt 102 is inserted. The insertion hole 121 is a hole having a shape in which two arcs 121*a*, 121*b* having different radii are combined in a manner that a center of the arc 121*a* with small radius is displaced upward by a predetermined amount with respect to a center of the arc 121b with large radius, at a surface orthogonal to an axial direction. Hereinafter, the arc with small radius is referred to as a small arc portion 121a, and the arc with large radius is referred to as a large arc portion 121b. Here, in the small arc portion 121a of the insertion hole 121, a part on an upper end side of a small diameter portion 123b of a collar 123 to be described later is inserted. Therefore, the radius of the small arc portion 121a is set to substantially the same as a radius of the small diameter portion 123b of the collar 123. Further, an angle made by the small arc portion 121a is set to not less than 120° nor more than 180°, for example. On the other hand, the radius of the large arc portion 121b is set to be larger than a radius of a large diameter portion 123a of the collar 123. On the holding piece 120a of the bracket 120, a screw hole 122 into which the screw portion 110a of the wing bolt 110 is screwed, is provided at a position below the insertion hole 121.

The holding plate 122 is a plate-shaped member formed by vertically bending a left end portion in the right-and-left direction in FIG. 15 toward a side opposite to the bracket 120 side. The holding plate 122 is provided with an insertion hole 122a through which the support bolt 102 is inserted. Further, at a lower portion of the holding plate 122, there is provided an insertion groove 122b in which the screw portion 110a of the wing bolt 110 which is temporarily screwed into the screw hole 122 of the bracket 120 is inserted, when the holding plate 122 is turned.

Further, the collar 123 which is externally fitted to the support bolt 102 after the pair of guide wheels 70 is externally fitted to the support bolt 102, has the following configuration. The collar 123 has a shape such that two cylinders with different outside diameters are arranged in a manner that a cylinder with large outside diameter (hereinafter, referred to as a large diameter portion) 123a is arranged on the pair of guide wheels 70 side, and a cylinder with small outside diameter (hereinafter, referred to as a small diameter portion) 123b is arranged on the holding plate 122 side. Here, a thickness T3 in an axial direction of the small diameter portion 123b is set to be larger than a thickness T4 of the bracket 120.

The pair of guide wheels 70 is attached to the bracket 120 in the order to be described below. The pair of guide wheels 70 is attached, in the order of the guide wheel 71 and the guide wheel 72, to the support bolt 102 to which the spacer 103 and the sleeve 104 are externally fitted. Further, the collar 123 is externally fitted to the support bolt 102 so that the large diameter portion 123a is positioned on the pair of guide wheels 70 side. After that, the tip of the screw portion 102a of the support bolt 102 is inserted through the insertion hole 121 provided to the holding piece 120a of the bracket 120 and the insertion hole 122a of the holding plate 122, in this order. Further, the spacer 106 is externally fitted to the tip of the screw portion 102a of the support bolt 102, and then a nut 107 is screwed into the tip. In the state where the nut 107 is screwed into the screw portion 102a of the support bolt 102, the pair of guide wheels 70 is sandwiched by the spacer 103 and the collar 123, and further, the holding plate 122 is sandwiched by the collar 123 and the spacer 106. Here, it is also possible to employ rolling bearings formed by dividing the sleeve 104 into two, and integrating the divided pieces with the guide wheel 71 and the guide wheel 72, respectively. Here, although the sleeve 104 and the collar 123 are individually provided, it is also possible to employ a collar as a result of integrating these.

In a similar manner to the first embodiment, the pair of guide wheels 70 held by the bracket 120 is held at the working position when manufacturing the curved belt conveyor apparatus 10. Further, when replacing the fan-shaped belt 15, the pair of guide wheels 70 is moved from the working position to the replacement position.

Regarding the collar 123 externally fitted to the support bolt 102, the large diameter portion 123a is abutted against the side surface of the guide wheel 72 of the pair of guide wheels 70, and the small diameter portion 123b is abutted against the holding plate 122. Therefore, at a position between the holding plate 122 and the large diameter portion 123a of the collar 123, there is formed a recessed portion 124 based on an outside diameter difference between the large diameter portion 123a and the small diameter portion 123b of the collar 123 (refer to FIG. 17).

Figure 16:
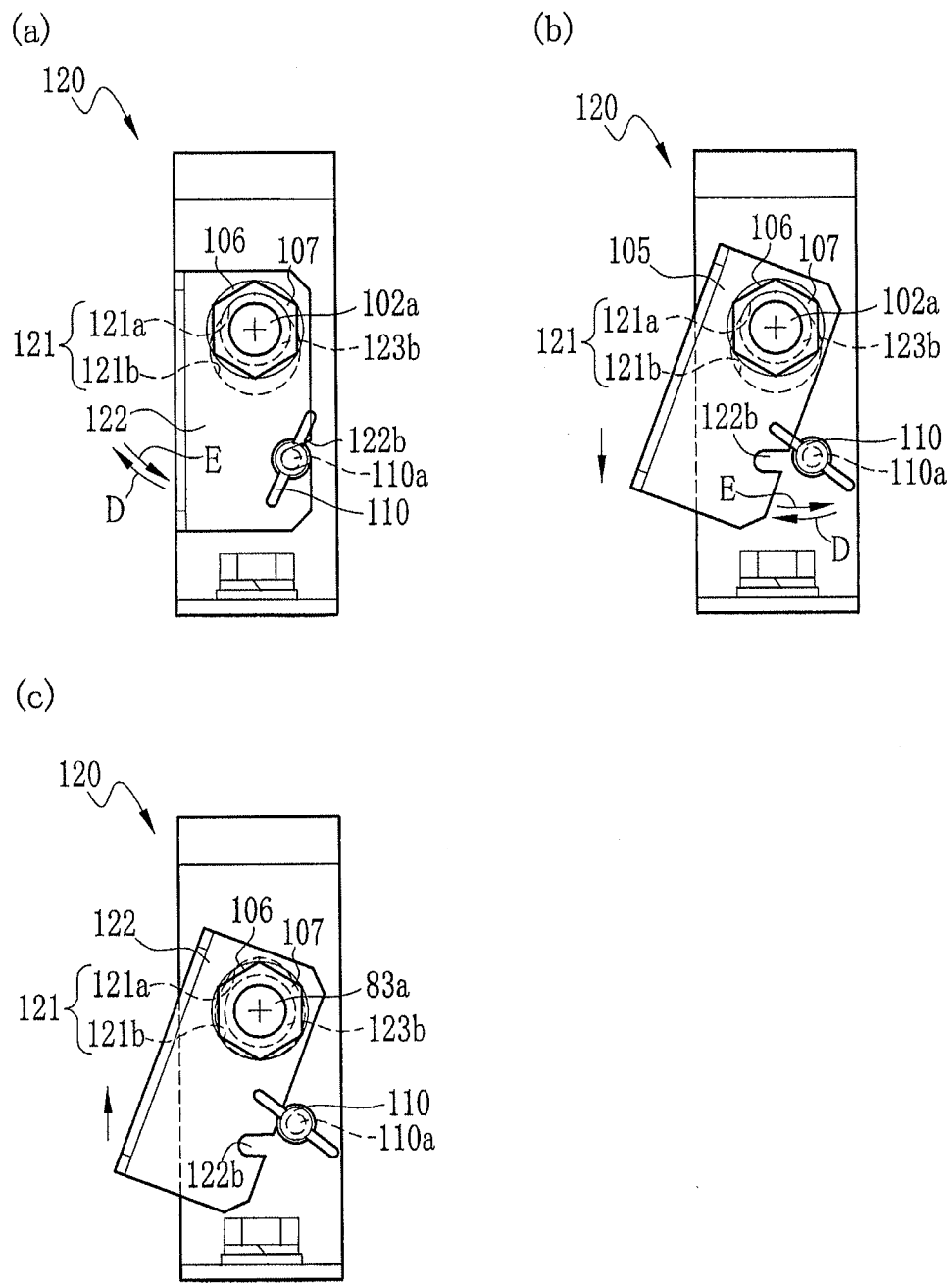
FIG. 16(a) is a view illustrating a holding plate at a fixing position (first position)
FIG. 16(b) is a view illustrating a state where the holding plate is turned.
FIG. 16(c) is a view illustrating the holding plate at a slidable position.
Figure 17:
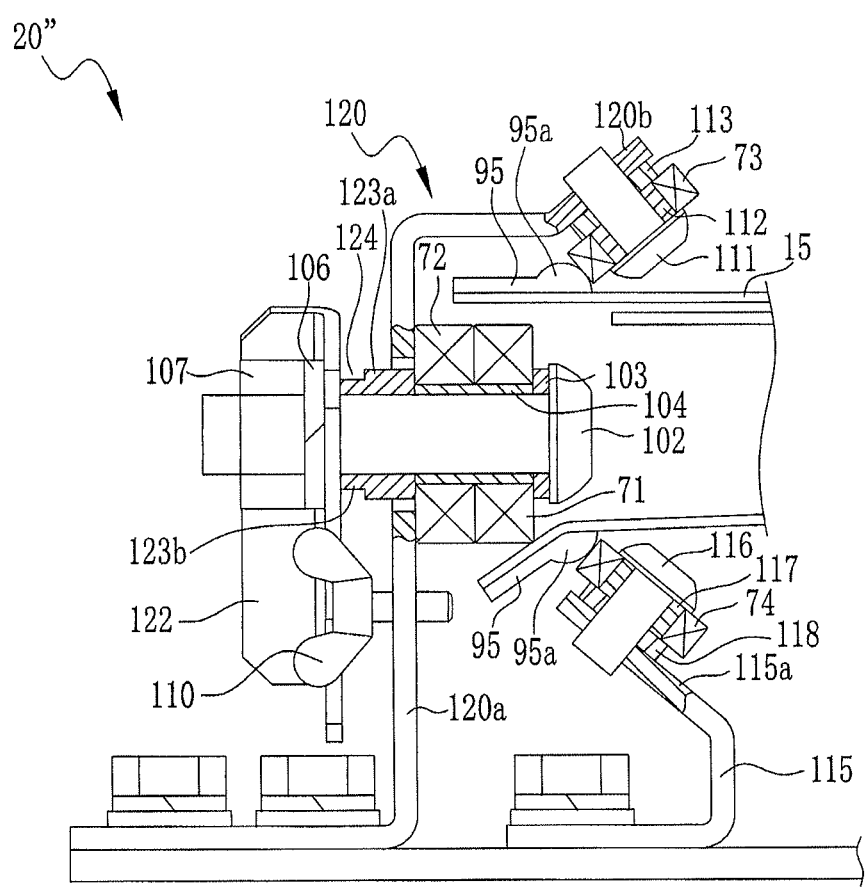
FIG. 17 is a view illustrating a configuration of the guide wheel unit at a replacement position (second position).

As illustrated in FIG. 14 and FIG. 16(a), when the pair of guide wheels 70 is at the working position, the upper end portion of the small diameter portion 123b of the collar 123 is in a state of being inserted into the small arc portion 121a of the insertion hole 121 of the bracket 120. Further, as illustrated in FIG. 17, when the pair of guide wheels 70 is at the replacement position, the guide wheel 72 of the pair of guide wheels 70 is in the state of being abutted against the holding piece 120a of the bracket 120. Here, as illustrated in FIG. 16(c), when the pair of guide wheels 70 is moved to the replacement position, the large diameter portion 123a of the collar 123 is in the state of being inserted through the large arc portion 121b of the insertion hole 121 of the bracket 120.

As illustrated in FIG. 16(a), FIG. 16(b), and FIG. 16(c), when the pair of guide wheels 70 is at the working position, the holding plate 122 can move between a position where the screw portion 110a of the wing bolt 110 screwed into the bracket 120 is inserted into the insertion groove 122b of the holding plate 122 (referred to as a fixing position, hereinafter), and a position where the screw portion 110a of the wing bolt 110 screwed into the bracket 120 is removed from the insertion groove 122b of the holding plate 122 (referred to as a slidable position, hereinafter). Note that a procedure of moving the holing plate 122 from the fixing position to the slidable position, is performed in two stages.

First, when the holding plate 122 is at the fixing position, the upper end portion of the small diameter portion 123b of the collar 123 is inserted into the small arc portion 121a of the insertion hole 121. Under this state, the holding plate 122 is in the state of being fastened to the bracket 120 by the wing bolt 110. Therefore, the tightened wing bolt 110 is loosened, and then the holding plate 122 is turned in a D direction. Consequently, the insertion groove 122b of the holding plate 122 is separated from the screw portion 110a of the wing bolt 110, and the screw portion 110a of the wing bolt 110 is removed from the inside of the insertion groove 122b of the holding plate 122.

When the screw portion 110a of the wing bolt 110 is removed from the inside of the insertion groove 122b of the holding plate 122, the holding plate 122 is allowed to move downward. Therefore, when the holding plate 122 is moved downward, the upper end portion of the small diameter portion 123b of the collar 123 is removed from the small arc portion 121a of the insertion hole 121. The whole small diameter portion 123b of the collar 123 moves to the inside of the large arc portion 121b of the insertion hole 121. Specifically, the position of the holding plate 122 at this time corresponds to the slidable position.

Hereinafter, a case where the fan-shaped belt 15 is wound around the tail pulley 16 and the head pulley 17 will be described. When the fan-shaped belt 15 is wound around the tail pulley 16 and the head pulley 17, the pair guide wheels 70 is at the replacement position (refer to FIG. 17). Specifically, the side surface of the guide wheel 72 of the pair of guide wheels 70 is abutted against the bracket 120, and the holding plate 122 is held at the position separated from the bracket 120 by the predetermined amount. At this time, a gap generated between the guide wheel 71 of the pair of guide wheels 70 and the guide wheel 73 becomes a gap larger than the thickness of the portion, where the projection portion 95a is provided, of the thick edge portion 95 provided to the front side of the outer peripheral edge portion of the belt part on the forward side of the fan-shaped belt 15. On the other hand, a gap generated between the guide wheel 71 of the pair of guide wheels 70 and the guide wheel 74 becomes a gap smaller than the thickness of the portion, where the projection portion 95a is provided, of the thick edge portion 95 provided to the front side of the outer peripheral edge portion of the belt part on the return side of the fan-shaped belt 15.

Therefore, after the fan-shaped belt 15 is wound around the tail pulley 16 and the head pulley 17, the holding plate 122 is moved downward, to thereby enlarge the gap generated between the guide wheel 71 of the pair of guide wheels 70 and the guide wheel 74. Subsequently, the outer peripheral edge portion of the belt part on the return side of the fan-shaped belt 15 is inserted into the gap generated between the pair of guide wheels 70 and the guide wheel 74. After the outer peripheral edge portion of the belt part on the return side of the fan-shaped belt 15 is inserted into the gap generated between the pair of guide wheels 70 and the guide wheel 74, the holding plate is moved upward. Consequently, there is created a state where the gap generated between the guide wheel 71 of the pair of guide wheels 70 and the guide wheel 74 is small. Therefore, the guide wheel 74 is in the state of being abutted against the projection portion 95a of the thick edge portion 95 provided to the front side of the outer peripheral edge portion of the fan-shaped belt 15.

On the other hand, the gap generated between the guide wheel 71 of the pair of guide wheels 70 and the guide wheel 73 becomes a gap larger than the thickness of the portion, where the projection portion 95a is provided, of the thick edge portion 95 provided to the front side of the outer peripheral edge portion of the belt part on the forward side of the fan-shaped belt 15. The outer peripheral edge portion of the belt part on the forward side of the fan-shaped belt 15 is inserted into the gap generated between the pair of guide wheels 70 and the guide wheel 73. When the outer peripheral edge portion of the belt part on the forward side of the fan-shaped belt 15 is inserted into the gap generated between the pair of guide wheels 70 and the guide wheel 73, there is created a state where the guide wheel 73 is abutted against the projection portion 95a of the thick edge portion 95 provided to the front side of the outer peripheral edge portion of the belt part on the forward side of the fan-shaped belt 15, from the pivot side of the fan-shaped belt 15.

Next, the holding plate 122 is pressed toward the bracket 120, to move the pair of guide wheels 70. The holding plate 122, which is in the state of being abutted against the bracket 120, is moved upward. In the state where the holding plate 122 is abutted against the bracket 120, the small arc portion 121a of the insertion hole 121 of the bracket 120 is positioned above the recessed portion 124 formed by the collar 123 and the holding plate 122. Therefore, when the holding plate 122 is moved upward, the pair of guide wheels 70 is also moved upward, resulting in that a peripheral edge portion of the small arc portion 121a of the insertion hole 121 of the bracket 120 is inserted into the recessed portion 124. In this state, the holding plate 122 is turned from the slidable position toward the fixing position (in an E direction in FIG. 16(a)). By the turning of the holding plate 122, the screw portion 110a of the wing bolt 110 is inserted into the insertion groove 122b. Under this state, the wing bolt 110 is tightened, to thereby fix the holding plate 122 at the fixing position.

In the state where the pair of guide wheels 70 is held at the working position, the gap generated between the pair of guide wheels 70 and the guide wheel 73 is a gap which is larger than the thickness of the portion, where the thick edge portion 95 is not provided, of the outer peripheral edge portion of the fan-shaped belt 15, and which is smaller than the thickness of the portion, where the thick edge portion 95 is provided, of the fan-shaped belt 15, for example. Further, the gap generated between the pair of guide wheels 70 and the guide wheel 74 is provided in a similar manner to the gap generated between the pair of guide wheels 70 and the guide wheel 73. As a result of this, when the fan-shaped belt 15 is traveled, the state where the guide wheel 73 is abutted against the projection portion 95a of the thick edge portion 95 provided to the front side of the outer peripheral edge portion of the belt part on the forward side of the fan-shaped belt 15, from the pivot side of the fan-shaped belt 15, is maintained, and further, it becomes possible to prevent the outer peripheral edge portion of the belt part from coming off the gap generated between the pair of guide wheels 70 and the guide wheel 73. In a similar manner, the state where the guide wheel 74 is abutted against the projection portion 95a of the thick edge portion 95 provided to the front side of the outer peripheral edge portion of the belt part on the return side of the fan-shaped belt 15, from the pivot side of the fan-shaped belt 15, is maintained, and it becomes possible to prevent the outer peripheral edge portion of the belt part from coming off the gap generated between the pair of guide wheels 70 and the guide wheel 74.

Further, when detaching the fan-shaped belt 15 wound around the tail pulley 16 and the head pulley 17, the wing bolt 110 is loosened, and the holding plate 122 is turned from the fixing position toward the slidable position (in a D direction in FIG. 16(a)). When the holding plate 122 is turned, the insertion groove 122b of the holding plate 122 is moved in a direction in which it separates from the screw portion 110a of the wing bolt 110, resulting in that the screw portion 110a of the wing bolt 110 is removed from the insertion groove 122b of the holding plate 122. Subsequently, the holding plate 122 is moved downward. When the holding plate 122 is moved downward, the small diameter portion 123b of the collar 123 is also moved downward, resulting in that the small diameter portion 123b of the collar 123 is removed from the small arc portion 121a of the insertion hole 121 of the bracket 120.

At last, the pair of guide wheels 70 is moved until the side surface of the guide wheel 72 of the pair of guide wheels 70 is abutted against the holding piece 120a of the bracket 120. In this state, there is generated, at a position between the pair of guide wheels 70 and the guide wheel 73, a gap larger than the thickness of the portion, where the projection portion 95a is provided, of the thick edge portion 95 provided to the outer peripheral edge portion of the belt part on the forward side of the fan-shaped belt 15. Therefore, the thick edge portion 95 provided to the front side of the outer peripheral edge portion of the belt part on the forward side of the fan-shaped belt 15 is pushed down to release the abutment between the projection portion 95a of the thick edge portion 95 provided to the front side of the outer peripheral edge portion of the belt part on the forward side of the fan-shaped belt 15 and the peripheral surface of the guide wheel 73. Subsequently, the outer peripheral edge portion of the belt part on the forward side of the fan-shaped belt 15 is pulled out from the gap generated between the pair of guide wheels 70 and the guide wheel 73.

On the other hand, at a position between the pair of guide wheels 70 and the guide wheel 74, a gap larger than the thickness of the portion, where the projection portion 95a is provided, of the thick edge portion 95 provided to the outer peripheral edge portion of the belt part on the return side of the fan-shaped belt 15, is not generated. Accordingly, the holding plate 122 is moved downward in a state where the large diameter portion 123a of the collar 123 is abutted against an inner peripheral surface of the large arc portion 121b of the insertion hole 121 of the bracket 120, and the pair of guide wheels 70 is moved upward. Consequently, at the position between the pair of guide wheels 70 and the guide wheel 74, there is generated a gap larger than the thickness of the portion, where the projection portion 95a is provided, of the thick edge portion 95 provided to the outer peripheral edge portion of the belt part on the return side of the fan-shaped belt 15. Therefore, the thick edge portion 95 provided to the front side of the outer peripheral edge portion of the belt part on the return side of the fan-shaped belt 15 is pushed down to release the abutment between the projection portion 95a of the thick edge portion 95 provided to the front side of the outer peripheral edge portion of the belt part on the return side of the fan-shaped belt 15 and the peripheral surface of the guide wheel 74. Subsequently, the outer peripheral edge portion of the belt part on the return side of the fan-shaped belt 15 is pulled out from the gap generated between the pair of guide wheels 70 and the guide wheel 74. Consequently, it becomes possible to detach the fan-shaped belt 15.

Next, description regarding the time of working of the curved belt conveyor apparatus 10 will be made. In the guide wheel unit 20", the peripheral surface of the guide wheel 73 is abutted against the projection portion 95a of the thick edge portion 95 provided to the front side of the outer peripheral edge portion of the belt part on the forward side of the fan-shaped belt 15, to press the rear side of the outer peripheral edge portion of the belt part on the forward side of the fan-shaped belt 15 against the respective guide wheels 71, 72 of the pair of guide wheels 70. In a similar manner, in the guide wheel unit 20, the peripheral surface of the guide wheel 74 is abutted against the projection portion 95a of the thick edge portion 95 provided to the front side of the outer peripheral edge portion of the belt part on the return side of the fan-shaped belt 15, to press the rear side of the outer peripheral edge portion of the belt part on the return side of the fan-shaped belt 15 against the respective guide wheels 71, 72 of the pair of guide wheels 70.

The fan-shaped belt 15 is pulled by the head pulley 17 which rotates when the curved belt conveyor apparatus 10 is driven. As described above, in the curved belt conveyor apparatus 10, the tail pulley 16 and the head pulley 17 are arranged with the predetermined opening angle provided therebetween, so that in the fan-shaped belt 15, the stress in the direction from the outer periphery to the pivot is generated. Therefore, the projection portion 95a of the thick edge portion 95 provided to the front side of the outer peripheral edge portion of the belt part on the forward side of the fan-shaped belt 15 is in the state of pressing the guide wheel 73. In like manner, the projection portion 95a of the thick edge portion 95 provided to the front side of the outer peripheral edge portion of the belt part on the return side of the fan-shaped belt 15 is in the state of pressing the guide wheel 74.

The stress in the direction from the outer periphery to the pivot is generated in each of the front side of the belt part on the forward side, and the front side of the belt part on the return side of the fan-shaped belt 15, but, on the rear side of the belt part on the forward side and the rear side of the belt part on the return side of the fan-shaped belt 15, not the stress in the direction from the outer periphery to the pivot but the stress in the direction from the pivot side to the outer periphery acts. The pair of guide wheels 70 is pressed toward the bracket 120 side by the stress in the direction from the pivot side to the outer periphery, which is generated in the rear side of the belt part on the forward side and the rear side of the belt part on the return side of the fan-shaped belt 15.

As described above, when the pair of guide wheels 70 is at the working position, the upper end portion of the small diameter portion 123b of the collar 123 is inserted into the small arc portion 121a of the insertion hole 121 of the bracket 120. In this state, the peripheral edge portion of the small arc portion 121a of the insertion hole 121 of the bracket 120 is inserted into the recessed portion 124 formed by the holding plate 122 and the large diameter portion 123a of the collar 123. Specifically, the peripheral edge portion of the small arc portion 121a of the insertion hole 121 of the bracket 120 is sandwiched by the recessed portion 124 generated between a stepped portion of the collar 123 and the holding plate 122. Further, the holding plate 122 is fastened to the bracket 120 by the wing bolt 110. As a result of this, even if the pair of guide wheels 70 is pressed toward the bracket 120 by the fan-shaped belt 15, the holding plate 122 does not vibrate, and the relative position of the holding plate 122 with respect to the bracket 120 in the direction from the pivot to the outer periphery of the fan-shaped belt 15 is kept constant.

Note that also in the third embodiment, operations to be performed with respect to the guide wheel unit 20" in the working of detaching the fan-shaped belt 15, include an operation of turning the holding plate 122 from the fixing position to the slidable position after performing an operation of loosening the wing bolt 110 screwed into the bracket 120, and an operation of moving the pair of guide wheels 70 from the working position to the replacement position. Further, as operations to be performed with respect to the guide wheel unit 20" in the working of attaching the fan-shaped belt 15, it is only required to perform an operation of moving the pair of guide wheels 70 from the replacement position to the working position, an operation of turning the holding plate 122 from the slidable position to the fixing position, and then an operation of tightening the wing bolt 110 screwed into the bracket 120. Therefore, it is possible to simplify the operations related to the working of replacement of the fan-shaped belt 15, and to improve the working efficiency in the working of replacement of the fan-shaped belt 15, in a similar manner to the second embodiment.

Each of the first to third embodiments employs the example in which, as the guide wheels abutted against the rear side of the outer peripheral edge portion of the belt part on the forward side and the rear side of the outer peripheral edge portion of the belt part on the return side, respectively, of the fan-shaped belt 15, there is provided the pair of guide wheels formed by arranging the two guide wheels each formed of the rolling bearing, in a parallel manner. However, if a guide wheel having a width larger than that of the rolling bearings used as the guide wheels 71, 72, can be employed, it is possible that the pair of guide wheels is not provided, but one guide wheel is provided.

The many features and advantages of tile embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. A curved belt conveyor apparatus, comprising:
an endless fan-shaped belt including, at a position close to an outer periphery of the fan-shaped belt, an edge portion projecting in a substantially semicircular shape in cross section from a front surface as an outer peripheral edge portion;
a head pulley being formed of a tapered roller and being driven by a motor;
a tail pulley being formed of a tapered roller having an angle same as a taper angle of the head pulley and driven in accordance with a rotation of the head pulley;
an apparatus frame pivotally supporting the head pulley and the tail pulley in a state where a predetermined opening angle is provided between the pulleys and the pulleys are inclined so that an upper surface of the fan-shaped belt wound around the head pulley and the tail pulley becomes a horizontal surface;
a plurality of guide wheel units being provided to the apparatus frame along a vicinity of the outer peripheral edge portion of the fan-shaped belt and pulling the fan-shaped belt in a direction from a pivot to the outer periphery of the fan-shaped belt by sandwiching the outer peripheral edge portion of the fan-shaped belt wound around the head pulley and the tail pulley from a front side and a rear side;
a bed being horizontally supported to the apparatus frame by fixing a portion of the bed on the pivot side of the fan-shaped belt to the apparatus frame and a portion of the bed on the outer peripheral side of the fan-shaped belt to the apparatus frame from gaps between the plurality of guide wheel units by using support members, and placing the fan-shaped belt; and
a pressing pulley being arranged below the head pulley and pressing the fan-shaped belt wound around the head pulley against the head pulley, wherein:
the pressing pulley is a tapered roller having an angle same as the taper angle of the head pulley and having a length in a rotation axis direction of a tapered outer tube which is set to be shorter than a length in a rotation axis direction of a taper-shaped outer tube of the head pulley; and
the pressing pulley prevents a slip between the head pulley and a rear surface of the fan-shaped belt which occurs when the head pulley rotates by being arranged in a state where a large-diameter-side end portion of the tapered outer tube is positioned in the vicinity of the outer peripheral edge portion of the fan-shaped belt and the pressing pulley is inclined so that a peripheral surface of the tapered outer tube presses a portion close to the outer periphery in a length from the pivot to the outer peripheral edge portion of the fan-shaped belt wound around the head pulley against a peripheral surface of the taper-shaped outer tube of the head pulley.

2. The curved belt conveyor apparatus according to claim 1, wherein:
the guide wheel unit includes:
a first guide wheel being abutted against each rear surface of the outer peripheral edge portion of the belt part on a forward side and a return side of the fan-shaped belt wound around the head pulley and the tail pulley;
a first holding member holding the first guide wheel in a state rotatably supporting the first guide wheel around a horizontal axis at a portion which vertically rises when a lower end portion of the member is fastened to the apparatus frame;
a second guide wheel being abutted against a projection portion projecting to the front side of the outer peripheral edge portion of the belt part on the forward side of the fan-shaped belt from the pivot side of the fan-shaped belt;
a second holding member being fixed to an upper end portion of the first holding member in a state rotatably supporting the second guide wheel;
a third guide wheel being abutted against a projection portion projecting to the front side of the outer peripheral edge portion of the belt part on the return side of the fan-shaped belt from the pivot side of the fan-shaped belt; and
a third holding member being fixed to a portion of the apparatus frame where a lower end portion of the member is positioned on the pivot side of the fan-shaped belt of the first holding member in a state rotatably supporting the third guide wheel; and
the guide wheel unit absorbs, by bending the portion of the first holding member which vertically rises, a variation of a pressing force on the second guide wheel which is pressed by the projection portion projecting to the front side of the outer peripheral edge portion of the belt part on the forward side due to a positional variation of the projection portion.

3. The curved belt conveyor apparatus according to claim 2, wherein
in the guide wheel unit, in order to optimize a pressing force on the third guide wheel which is pressed by the projection portion projecting to the front side of the outer peripheral edge portion of the belt part on the return side of the fan-shaped belt, the lower end portion of the third holding member is weakly fastened to the apparatus frame at the portion of the apparatus frame positioned on the pivot side of the belt part of the fan-shaped belt of the first holding member, and after that, the fan-shaped belt is previously driven, and after the third guide wheel is set to a position where the third guide wheel does not bite into the projection portion projecting to the front side of the outer peripheral edge portion of the belt part on the return side of the fan-shaped belt, the lower end portion of the third holding member is fastened and fixed to the apparatus frame.

4. The curved belt conveyor apparatus according to claim 2, wherein:
the first guide wheel can slide between a first position and a second position, the first position is a position where the first guide wheel pulls together with the second guide wheel the fan-shaped belt in the outer peripheral direction of the fan-shaped belt while preventing coming-off of the outer peripheral edge portion of the belt part on the forward side of the fan-shaped belt and the first guide wheel pulls together with the third guide wheel the fan-shaped belt in the outer peripheral direction of the fan-shaped belt while preventing coming-off of the outer peripheral edge portion of the belt part on the return side of the fan-shaped belt, and the second position is a position on an outer side than the first position in a radial direction of the fan-shaped belt and where the fan-shaped belt can be attached and detached;

in the guide wheel unit, a collar is externally fitted around a rotation shaft of the first guide wheel at a position on an outside in the radial direction of the fan-shaped belt of the first guide wheel, and then the first guide wheel is pivotally supported by the first holding member in a slidable manner to a shaft fitting hole of the first holding member; and the guide wheel unit includes:
- a plate-shaped member attached to the rotation shaft of the first guide wheel which is abutted against the first holding member when the first guide wheel is at the first position, and moves to a position separated from the first holding member when the first guide wheel is slid from the first position to the second position; and
- a fastening member which fastens the plate-shaped member abutted against the first holding member to the first holding member, and holds the first guide wheel at the first position.

5. The curved belt conveyor apparatus according to claim 4, wherein
the fastening member is formed of:
- a cylindrical member having a locking portion inserted into an insertion hole provided to the first holding member when the first guide wheel is moved from the second position to the first position; and
- a pressing member pressing out the locking portion of the cylindrical member toward an outside in a radial direction of the cylindrical member when pressed into the cylindrical member to make the locking portion of the cylindrical member locks in the insertion hole.

6. The curved belt conveyor apparatus according to claim 2, wherein
each of the first guide wheel, the second guide wheel, and the third guide wheel is a rolling bearing having an inner ring to which a center shaft is fitted and a portion which slides with the fan-shaped belt as an outer ring.

7. The curved belt conveyor apparatus according to claim 2, wherein
the first guide wheel is formed of at least two or more rolling bearings arranged in parallel each having an inner ring to which a center shaft is fitted and a portion which slides with the fan-shaped belt as an outer ring.

8. The curved belt conveyor apparatus according to any claim 1, wherein
a small-diameter-side end portion of the tapered outer tube of the pressing pulley, a small-diameter-side end portion of the taper-shaped outer tube of the head pulley, and a small-diameter-side end portion of a taper-shaped outer tube of the tail pulley are pivotally supported by spherical bearings.

9. A curved belt conveyor apparatus, comprising:
an endless fan-shaped belt including, at a position close to an outer periphery of the fan-shaped belt, an edge portion projecting in a substantially semicircular shape in cross section from a front surface as an outer peripheral edge portion;
a head pulley being formed of a tapered roller and being driven by a motor;
a tail pulley being formed of a tapered roller having an angle same as a taper angle of the head pulley and driven in accordance with a rotation of the head pulley;
an apparatus frame pivotally supporting the head pulley and the tail pulley in a state where a predetermined opening angle is provided between the pulleys and the pulleys are inclined so that an upper surface of the fan-shaped belt wound around the head pulley and the tail pulley becomes a horizontal surface;
guide wheel units being provided in plural numbers to the apparatus frame along a vicinity of the outer peripheral edge portion of the fan-shaped belt pulling the fan-shaped belt in a direction from a pivot to the outer periphery of the fan-shaped belt by sandwiching the outer peripheral edge portion of the fan-shaped belt wound around the head pulley and the tail pulley from a front side and a rear side; and
a bed being horizontally supported to the apparatus frame by fixing a portion of the bed on the pivot side of the fan-shaped belt to the apparatus frame and a portion of the bed on the outer peripheral side of the fan-shaped belt to the apparatus frame from gaps between the plurality of guide wheel units by using support members, and placing the fan-shaped belt, wherein:
the guide wheel unit includes:
- a first guide wheel being abutted against each rear surface of the outer peripheral edge portion of the belt part on a forward side and a return side of the fan-shaped belt wound around the head pulley and the tail pulley;
- a second guide wheel being abutted against a projection portion projecting to the front side of the outer peripheral edge portion of the belt part on the forward side of the fan-shaped belt from the pivot side of the fan-shaped belt; and
- a third guide wheel being abutted against a projection portion projecting to the front side of the outer peripheral edge portion of the belt part on the return side of the fan-shaped belt from the pivot side of the fan-shaped belt;

the first guide wheel can move between a first position and a second position, the first position is a position where the first guide wheel pulls together with the second guide wheel the fan-shaped belt in the outer peripheral direction of the fan-shaped belt while preventing coming-off of the outer peripheral edge portion of the belt part on the forward side of the fan-shaped belt and the first guide wheel pulls together with the third guide wheel the fan-shaped belt in the outer peripheral direction of the fan-shaped belt while preventing coming-off of the outer peripheral edge portion of the belt part on the return side of the fan-shaped belt, and the second position is a position on an outer side than the first position in a radial direction of the fan-shaped belt and the fan-shaped belt can be attached and detached; and the guide wheel unit includes:
- a collar externally fitted onto a rotation shaft of the first guide wheel at a position on the outside in the radial direction of the fan-shaped belt of the first guide wheel in an axial direction of the rotation shaft of the first guide wheel;
- a first holding member holding the first guide wheel in a movable manner between the first position and the second position in a state where the collar externally fitted onto the rotation shaft of the first guide wheel is inserted into the first holding member;

a plate-shaped member pivotally supporting the rotation shaft of the first guide wheel to which the collar is externally fitted and being abutted against the first holding member when the first guide wheel is moved to the first position;
a locking portion locking the first holding member when the first guide wheel is moved to the first position and makes the plate-shaped member to be held in a state of being abutted against the first holding member; and
a fastening member fastening to the first holding member the plate-shaped member which is held in the state of being abutted against the first holding member by the locking portion.

10. The curved belt conveyor apparatus according to claim 9, wherein:
the locking portion is a locking piece provided to the plate-shaped member on a side of the first guide wheel of a member main body of the plate-shaped member with a predetermined interval provided to the member main body; and
the plate-shaped member can turn, around the rotation shaft of the first guide wheel, between a locking position and a retreat position, the locking position is a position where a part of the first holding member is inserted into a gap generated between the locking piece and the member main body and sandwiches the part of the first holding member with the locking piece and the member main body, and the retreat position is a position where the member retreats from the locking position and releases the sandwiching of the part of the first holding member sandwiched with the locking piece and the member main body.

11. The curved belt conveyor apparatus according to claim 10, wherein:
the fastening member is a bolt screwed into a screw hole provided to the first holding member;
the plate-shaped member has a groove portion into which a screw portion of the bolt temporarily screwed into the screw hole provided to the first holding member is inserted when the plate-shaped member is turned from the retreat position to the locking position; and
the bolt can fasten the plate-shaped member to the first holding member in response to the insertion of the screw portion of the bolt into the groove portion of the plate-shaped member when the plate-shaped member is turned from the retreat position to the locking position.

12. The curved belt conveyor apparatus according to claim 9, wherein:
the collar is two collars with different outside diameters;
the first holding member has an insertion hole in a shape of combining a small arc portion and a large arc portion, the small arc portion is an arc portion into which an upper end portion of the collar with smaller outside diameter among the two collars with different outside diameters is inserted, and the large arc portion is an arc portion of which an inside diameter is larger than an inside diameter of the small arc portion and through which each of the two collars with different outside diameters can be inserted;
the locking portion is a recessed portion formed by the two collars with different outside diameters and the plate-shaped member by abutting the plate-shaped member against the collar with smaller outside diameter among the two collars with different outside diameters; and by being inserted a peripheral edge portion of the small arc portion into the recessed portion when moving the first guide wheel to the first position, a part of the first holding member is sandwiched by the collar with larger outside diameter and the plate-shaped member.

13. The curved belt conveyor apparatus according to claim 12, wherein:
the fastening member is a bolt screwed into a screw hole provided to the first holding member;
the plate-shaped member has a groove portion into which a screw portion of the bolt temporarily fixed to the screw hole provided to the first holding member is inserted;
the plate-shaped member can turn between a position where the screw portion of the bolt temporarily fixed to the screw hole provided to the first holding member is inserted into the groove portion and a position where the insertion of the screw portion of the bolt into the groove portion is released when the first guide wheel is at the first position; and
the bolt can fasten the plate-shaped member to the first holding member in response to the turning of the plate-shaped member and the insertion of the screw portion of the bolt into the groove portion of the plate-shaped member.

14. The curved belt conveyor apparatus according to any claim 9, wherein
the first holding member holds the first guide wheel in a state rotatably supporting the first guide wheel around a horizontal axis at a portion which vertically rises when a lower end portion of the member is fastened to the apparatus frame and rotatably supports the second guide wheel at a tip portion where an upper end portion of the vertically risen portion is further bent a plurality of times.

15. The curved belt conveyor apparatus according to claim 9, further comprising
a second holding member being fixed to a portion of the apparatus frame where a lower end portion of the member is positioned on the pivot side of the fan-shaped belt of the first holding member in a state rotatably supporting the third guide wheel, wherein
in the guide wheel unit, in order to optimize a pressing force on the third guide wheel which is pressed by the projection portion projecting to the front side of the outer peripheral edge portion of the belt part on the return side of the fan-shaped belt, the lower end portion of the second holding member is weakly fastened to the apparatus frame at the portion of the apparatus frame positioned on the pivot side of the belt part of the fan-shaped belt of the first holding member, and after that, the fan-shaped belt is previously driven, and after the third guide wheel is set to a position where the third guide wheel does not bite into the projection portion projecting to the front side of the outer peripheral edge portion of the belt part on the return side of the fan-shaped belt, the lower end portion of the second holding member is fastened and fixed to the apparatus frame.

16. The curved belt conveyor apparatus according to claim 9, further comprising
a pressing pulley being arranged below the head pulley and pressing the fan-shaped belt wound around the head pulley against the head pulley, wherein:
the pressing pulley is a tapered roller having an angle same as the taper angle of the head pulley and having a length in a rotation axis direction of a tapered outer tube which is set to be shorter than a length in a rotation axis direction of a taper-shaped outer tube of the head pulley; and the pressing pulley prevents a slip between the head pulley and a rear surface of the fan-shaped belt which occurs when the head pulley rotates by being arranged in a state where a large-diameter-side end portion of the tapered outer tube is positioned in the vicinity of the outer peripheral edge portion of the fan-shaped belt and the pressing pulley is inclined so that a peripheral surface of the tapered outer tube presses a portion close to the outer periphery in a length from the pivot to the outer peripheral edge portion of the fan-shaped belt wound around the head pulley against a peripheral surface of the taper-shaped outer tube of the head pulley.

17. The curved belt conveyor apparatus according to claim 16, wherein a small-diameter-side end portion of the tapered outer tube of the pressing pulley, a small-diameter-side end portion of the taper-shaped outer tube of the head pulley, and a small-diameter-side end portion of a taper-shaped outer tube of the tail pulley are pivotally supported by spherical bearings.

18. The curved belt conveyor apparatus according to claim 9, wherein each of the first guide wheel, the second guide wheel, and the third guide wheel is a rolling bearing having an inner ring to which a center shaft is fitted and a portion which slides with the fan-shaped belt as an outer ring.

19. The curved belt conveyor apparatus according to claim 9, wherein the first guide wheel is formed of at least two or more rolling bearings arranged in parallel each having an inner ring to which a center shaft is fitted and a portion which slides with the fan-shaped belt as an outer ring.

* * * * *